US011700651B2

(12) United States Patent
Chen et al.

(10) Patent No.: US 11,700,651 B2
(45) Date of Patent: Jul. 11, 2023

(54) METHOD OF RADIO BEARER TRANSMISSION IN DUAL CONNECTIVITY

(71) Applicant: ACER INCORPORATED, New Taipei (TW)

(72) Inventors: Hung-Chen Chen, New Taipei (TW); Ching-Wen Cheng, New Taipei (TW)

(73) Assignee: ACER INCORPORATED, New Taipei (TW)

(*) Notice: Subject to any disclaimer, the term of this patent is extended or adjusted under 35 U.S.C. 154(b) by 44 days.

(21) Appl. No.: 17/092,341

(22) Filed: Nov. 9, 2020

(65) Prior Publication Data

US 2021/0058987 A1 Feb. 25, 2021

Related U.S. Application Data

(62) Division of application No. 15/072,363, filed on Mar. 17, 2016, now Pat. No. 10,869,344.

(60) Provisional application No. 62/135,186, filed on Mar. 19, 2015.

(51) Int. Cl.
*H04W 76/11* (2018.01)
*H04W 76/15* (2018.01)
*H04W 36/00* (2009.01)
*H04W 36/14* (2009.01)

(52) U.S. Cl.
CPC ........ *H04W 76/11* (2018.02); *H04W 36/0027* (2013.01); *H04W 76/15* (2018.02); *H04W 36/14* (2013.01)

(58) Field of Classification Search
CPC . H04W 76/11; H04W 36/0027; H04W 76/15; H04W 28/08; H04W 36/14; H04W 76/34
See application file for complete search history.

(56) References Cited

U.S. PATENT DOCUMENTS 9,210,614 B2 12/2015 Wang
9,635,587 B2 4/2017 Gao
9,763,151 B2 9/2017 Kim
(Continued)

FOREIGN PATENT DOCUMENTS

CN 102438284 A 5/2012
CN 103404179 A 11/2013
(Continued)

OTHER PUBLICATIONS

3rd Generation Partnership Project; Technical Specification Group Radio Access Network; Evolved Universal Terrestrial Radio Access Network (E-UTRAN); X2 interface user plane protocol (Release 12), 3GPP TS 36.425 V12.0.0 (Dec. 2014), pp. 1-15, XP050927353.
(Continued)

*Primary Examiner* — Un C Cho
*Assistant Examiner* — Lalita W Pace
(74) *Attorney, Agent, or Firm* — Winston Hsu

(57) ABSTRACT

A method of radio bearer transmission in dual connectivity for a network in a long term evolution (LTE) system is disclosed. The method comprises generating at least a packet data convergence protocol protocol data unit (PDCP PDU) by a PDCP entity of the network corresponding to a radio bearer (RB), and assigning each PDCP PDU with an identity, wherein the identity indicates which PDCP entity the PDCP PDU belongs to.

10 Claims, 22 Drawing Sheets

(56) References Cited

U.S. PATENT DOCUMENTS

| | | | |
|---|---|---|---|
| 2013/0083661 A1 | 4/2013 | Gupta | |
| 2014/0056243 A1 | 2/2014 | Pelletier | |
| 2014/0286159 A1 | 9/2014 | Etemad | |
| 2014/0307623 A1 | 10/2014 | Gheorghiu | |
| 2014/0307707 A1* | 10/2014 | Mestanov | H04W 36/0066 370/331 |
| 2015/0043435 A1 | 2/2015 | Blankenship | |
| 2015/0043492 A1 | 2/2015 | Baek | |
| 2015/0181593 A1 | 6/2015 | Kim | |
| 2015/0271726 A1* | 9/2015 | Kim | H04W 36/0069 370/329 |
| 2015/0350989 A1 | 12/2015 | Himayat | |
| 2015/0351079 A1 | 12/2015 | Himayat | |
| 2016/0066233 A1 | 3/2016 | Balachandran | |
| 2016/0157293 A1 | 6/2016 | Pazhyannur | |
| 2016/0174107 A1 | 6/2016 | Kanugovi | |
| 2016/0323790 A1* | 11/2016 | Wang | H04W 76/15 |
| 2016/0337958 A1 | 11/2016 | Fujishiro | |
| 2016/0338068 A1* | 11/2016 | Cheng | H04W 28/08 |
| 2017/0013668 A1 | 1/2017 | Chang | |
| 2017/0034866 A1 | 2/2017 | Wager | |
| 2017/0055166 A1 | 2/2017 | Shi | |
| 2017/0135151 A1 | 5/2017 | Fujishiro | |
| 2017/0149546 A1 | 5/2017 | Zhang | |
| 2017/0257816 A1 | 9/2017 | Teyeb | |
| 2017/0353914 A1 | 12/2017 | Jung | |
| 2017/0367141 A1 | 12/2017 | Nagasaka | |
| 2018/0176975 A1* | 6/2018 | Peng | H04W 76/20 |

FOREIGN PATENT DOCUMENTS

| | | |
|---|---|---|
| CN | 103686883 A | 3/2014 |
| CN | 103974325 A | 8/2014 |
| EP | 2 835 925 A1 | 2/2015 |
| EP | 3 032 871 | 6/2016 |
| WO | 2015021412 A1 | 2/2015 |
| WO | 2015032043 A1 | 3/2015 |

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12), 3GPP TS 36.423 V12.4.2 (Dec. 2014), pp. 1-204, XP050927358.

3rd Generation Partnership Project; Technical Specification Group Radio Access Network; Study on Wireless Local Area Network (WLAN)-3GPP radio interworking (Release 12), 3GPP TR 37.834 V12.0.0 (Dec. 2013), pp. 1-17, XP050729404.

3GPP TS 36.300 V12.4.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Dec. 2014, pp. 1-251, XP050927457.

3GPP TS 36.331 V12.4.1, Technical Specification, 3rd Generation Partnership Project; Technical Specification Group Radio Access Network; Evolved Universal Terrestrial Radio Access (E-UTRA); Radio Resource Control (RRC); Protocol specification (Release 12); Dec. 2014; pp. 1-410; XP050927575.

Intel Corporation, China Telecom, Qualcomm Incorporated; New WI Proposal: LTE-WLAN Radio Level Integration and Interworking Enhancement; 3GPP TSG RAN Meeting #67; RP-150510; Mar. 9-12, 2015; Shanghai, China, revision of RP-yynnnn; XP055500832.

3GPP TS 36.300 V12.4.0, 3rd Generation partnership Project; Technical Specification Group Radio Access Network; Evolved Universal Terrestrial Radio Access (E-UTRA) and Evolved Universal Terrestrial Radio Access Network (E-UTRAN); Overall description; Stage2 (Release 12), coverpage & p. 2, 84-90, Dec. 2014.

Intel Corporation et al., New WI Proposal: LTE-WLAN Radio Level Integration and Interworking Enhancement, 3GPP TSG RAN Meeting #67 RP-150510, Shanghai, China, Mar. 9, 2015.

* cited by examiner

METHOD OF RADIO BEARER TRANSMISSION IN DUAL CONNECTIVITY

CROSS REFERENCE TO RELATED APPLICATIONS

This application is a divisional application of U.S. application Ser. No. 15/072,363, filed on Mar. 17, 2016, which claims the benefit of U.S. Provisional Application No. 62/135,186, filed on Mar. 19, 2015 and entitled "Radio Resource Integration on Heterogeneous Access Networks". The contents of these applications are incorporated herein by reference.

BACKGROUND OF THE INVENTION

1. Field of the Invention

The present invention relates to a method used in a wireless communication system, and more particularly, to a method of radio bearer transmission in dual connectivity.

2. Description of the Prior Art

3GPP in Release 12 proposes dual connectivity technique in LTE system, which allows a UE to connect and use both resources of two eNBs (i.e. MeNB and SeNB), to increase the throughput. Extending the concept of dual connectivity, 3GPP in Release 13 further proposes RAN-level aggregation of LTE and WLAN. Refer to FIG. 1, which illustrates dual connectivity in LTE-WLAN aggregation. In FIG. 1, the UE of the LTE system is simultaneously connected to the eNB of the LTE system and the WiFi AP of the WLAN, wherein the eNB is similar to a role of MeNB, and the WiFi AP is similar to a role of SeNB. In practical, the eNB is charged for scheduling data transmission on LTE and Wi-Fi radio links.

In addition, a split radio bearer for data offloading is introduced in Release 12. Refer to FIG. 2, which illustrates dual connectivity split-bearer architecture. In FIG. 2, a radio bearer (RB) is transmitted to the MeNB, and then a packet data convergence protocol (PDCP) entity of the MeNB generates PDCP PDUs based on the received RB. The PDCP entity of the MeNB routes some of the PDCP PDUs to a radio link control (RLC) entity of the MeNB and some to a RLC entity of the SeNB. In other words, a radio bearer for which its radio protocols are located in both MeNB and SeNB to use radio resources provided by both the MeNB and the SeNB is defined as a split radio bearer. In a word, a RB splits over multiple eNBs is called as a split RB. With split radio bearer technique, a UE can receive a RB via both MeNB and SeNB.

The applicant notices that there is no existing radio resource integration mechanism in LTE-WLAN aggregation. For example, the eNB transmits two RBs each corresponding to a PDCP entity, to the UE, wherein one RB is a split RB transmitted via the eNB and the WiFi AP. Since the WiFi AP does not have the same radio protocols (i.e. PDCP entity and RLC entity) as the eNB, the WiFi AP transmits the split RB as normal data to the UE (i.e. via WiFi MAC entity) and does not aware of the split RB. In this case, when the UE receives data of the split RB from the WiFi AP, the UE does not know which PDCP entity the data of the split RB should route to.

SUMMARY OF THE INVENTION

It is therefore an objective to provide a method of radio bearer transmission to solve the above problem.

The present invention discloses a method of radio bearer transmission in dual connectivity for a network in a long term evolution (LTE) system. The method comprises generating at least a packet data convergence protocol protocol data unit (PDCP PDU) by a PDCP entity of the network corresponding to a radio bearer (RB), and assigning each PDCP PDU with an identity, wherein the identity indicates which PDCP entity the PDCP PDU belongs to.

The present invention discloses a method of radio bearer transmission in dual connectivity for an access point (AP) of wireless local area network (WLAN). The method comprises receiving a packet data convergence protocol protocol data unit (PDCP PDU) associated to a RB with an identity from a network of a long term evolution (LTE) system, wherein the identity indicates which PDCP entity the PDCP PDU belongs to and is assigned by the network, transmitting the received PDCP PDU with the identity, to a mobile device of the LTE system, and informing the network the successful delivery of the PDCP PDU, to the mobile device.

The present invention discloses a method of radio bearer transmission in dual connectivity for a mobile device in a long term evolution (LTE) system, wherein the mobile device is capable of simultaneously connecting to an access point (AP) of a wireless local area network (WLAN) and a network of the LTE system. The method comprises receiving a packet data convergence protocol protocol data unit (PDCP PDU) associated to a RB with an identity, from the AP, wherein the identity indicates which PDCP entity the PDCP PDU belongs to and is assigned by the network, removing the identity of the PDCP PDU, and delivery the PDCP PDU to the corresponding PDCP entity according to the identity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
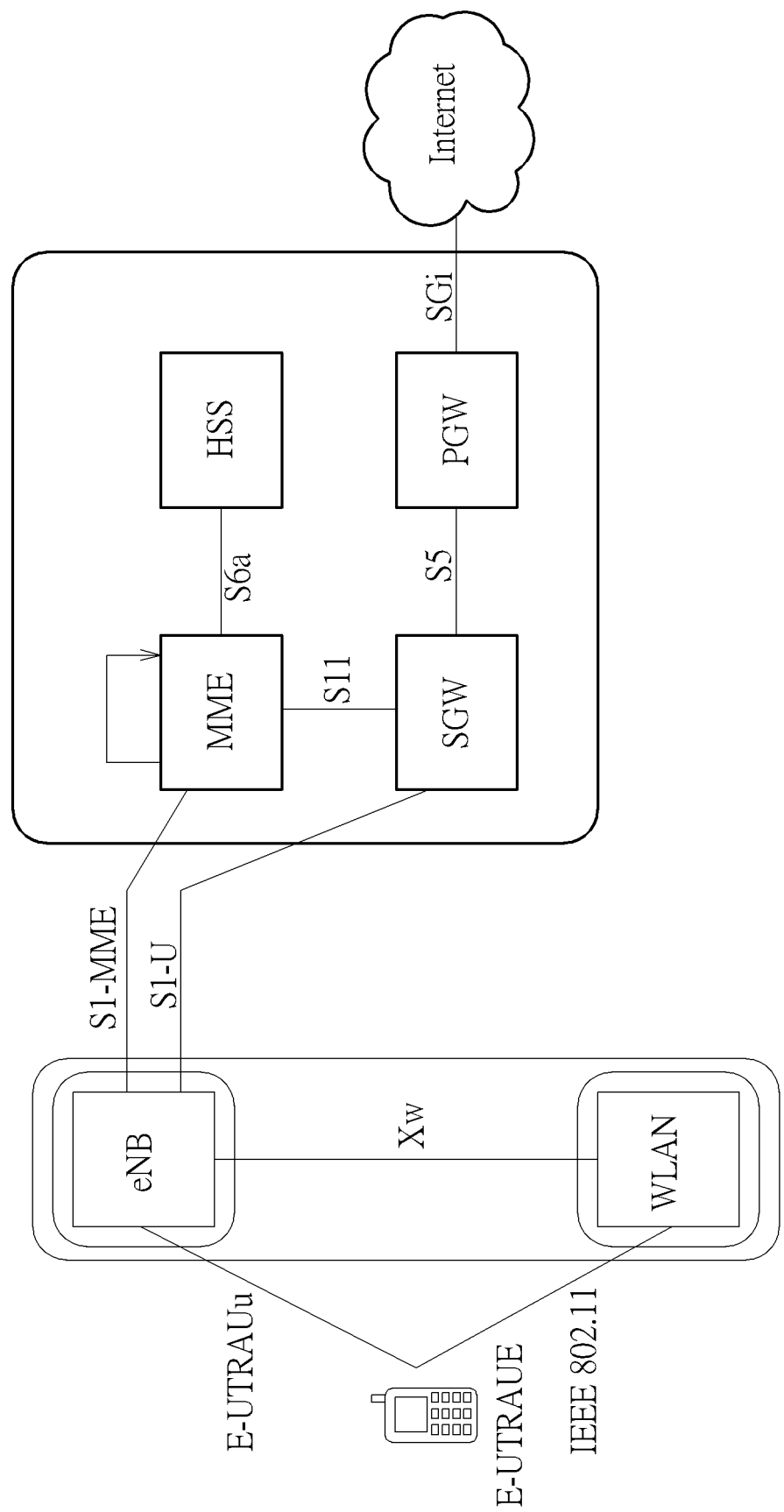
FIG. 1 is a schematic diagram of a deployment of LTE-WLAN aggregation according to the prior art.
Figure 2:
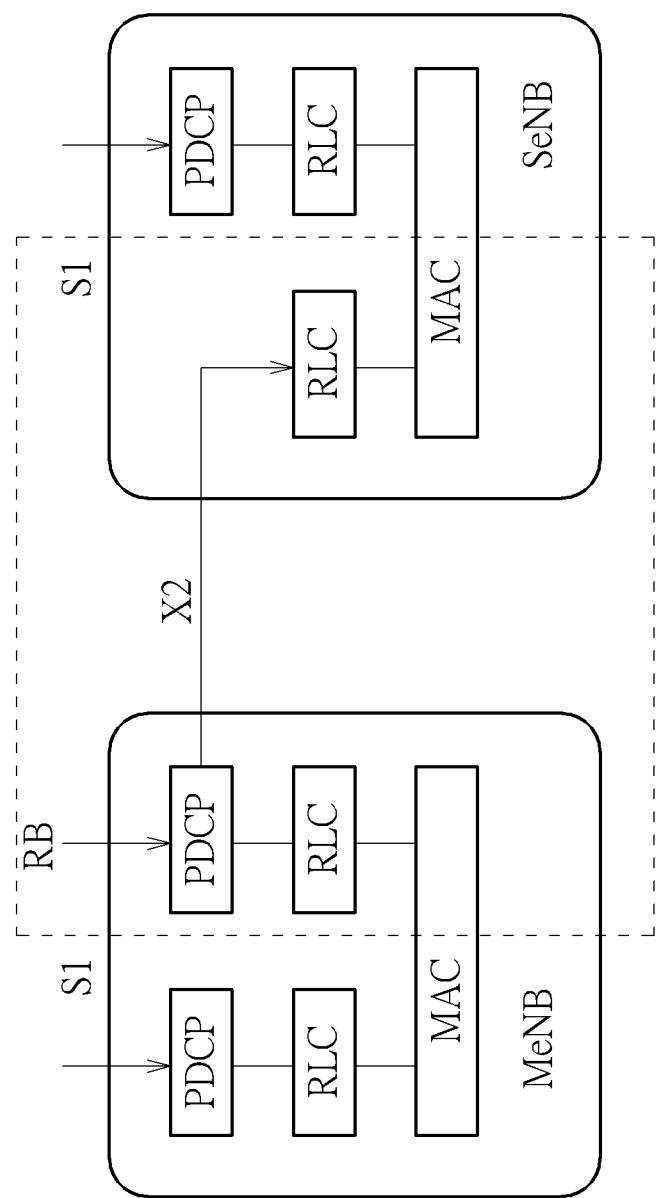
FIG. 2 is a schematic diagram of a dual connectivity split-bearer architecture according to the prior art.
Figure 3:
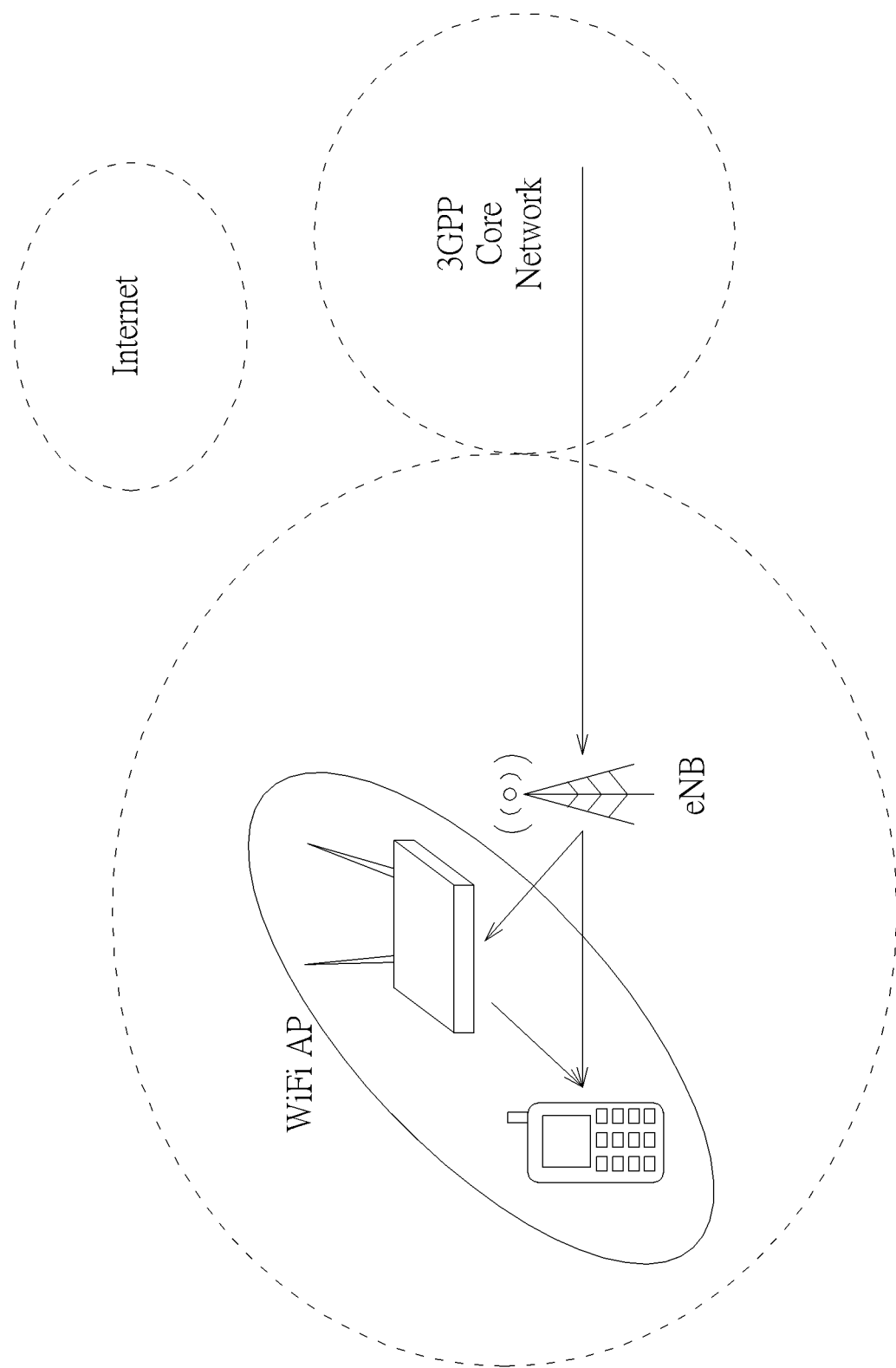
FIG. 3 is a schematic diagram of a deployment scenario for LTE-WLAN aggregation.

Please refer to FIG. 3, which is a schematic diagram of a deployment scenario for LTE-WLAN aggregation. LTE-WLAN aggregation is composed of an eNB and a UE of the LTE system and a WiFi AP of WLAN. In addition, the eNB is the anchor node for both data and control planes and connects to the core network. As a result, the eNB is responsible for radio bearer (RB) transmission to the UE via itself and/or WiFi AP. On the other hand, the UE is capable of dual connectivity to receive data of a RB from both of the eNB and WiFi AP. Note that, in this article, there are three RB types: a normal RB which is transmitted by using eNB resource, a split RB which is transmitted by simultaneously using both eNB and WiFi AP resources, and an assisted RB which is transmitted by using WiFi AP resource.

Figure 4:
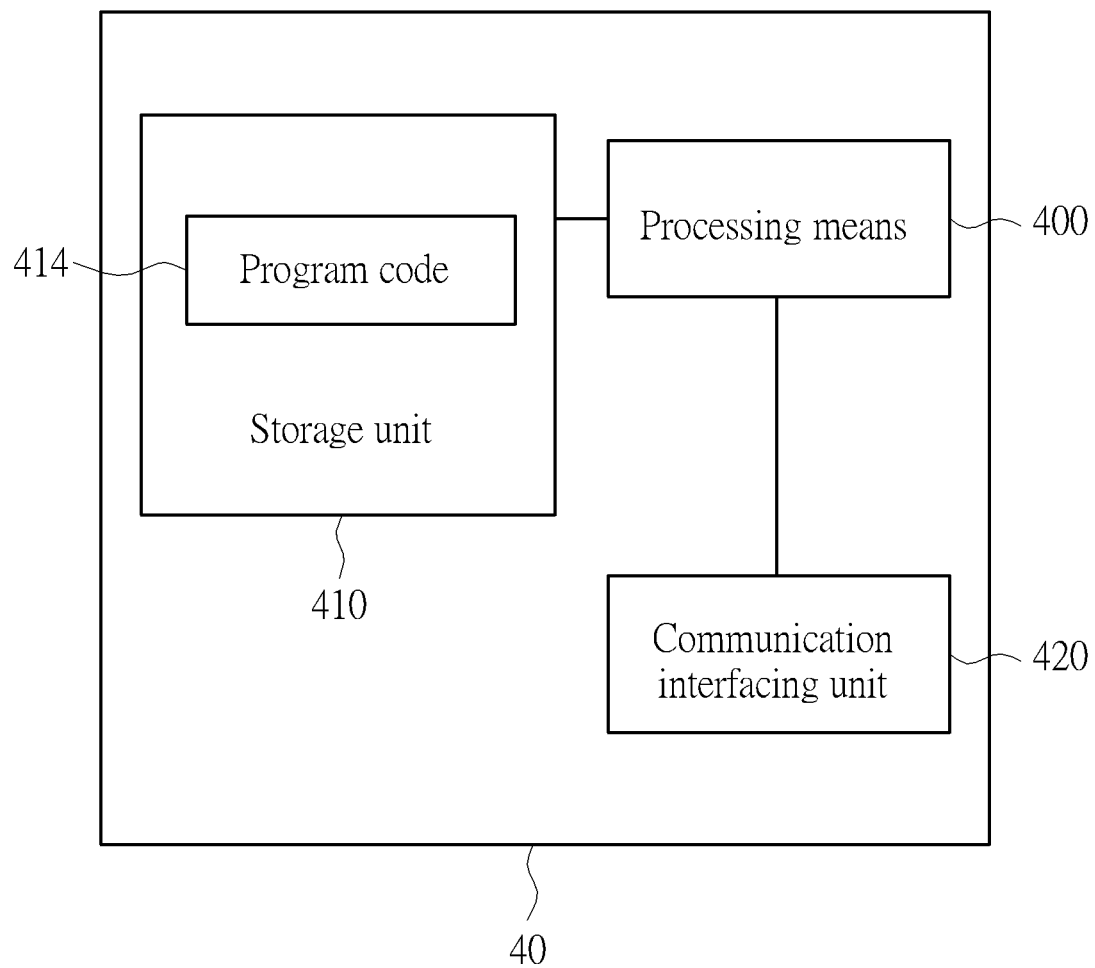
FIG. 4 is a schematic diagram of an exemplary communication device.

FIG. 4 is a schematic diagram of an exemplary communication device 40. The communication device 40 can be the UE, eNB, or WiFi AP shown in FIG. 3. The communication device 40 may include a processing means 400 such as a microprocessor or Application Specific Integrated Circuit (ASIC), a storage unit 410 and a communication interfacing unit 420. The storage unit 410 may be any data storage device that can store program code 414, for access by the processing means 400. Examples of the storage unit 410 include but are not limited to a subscriber identity module (SIM), read-only memory (ROM), flash memory, random-access memory (RAM), CD-ROMs, magnetic tape, hard disk, and optical data storage device. The communication interfacing unit 420 is preferably a radio transceiver and can exchange wireless signals according to processing results of the processing means 400.

Figure 5:
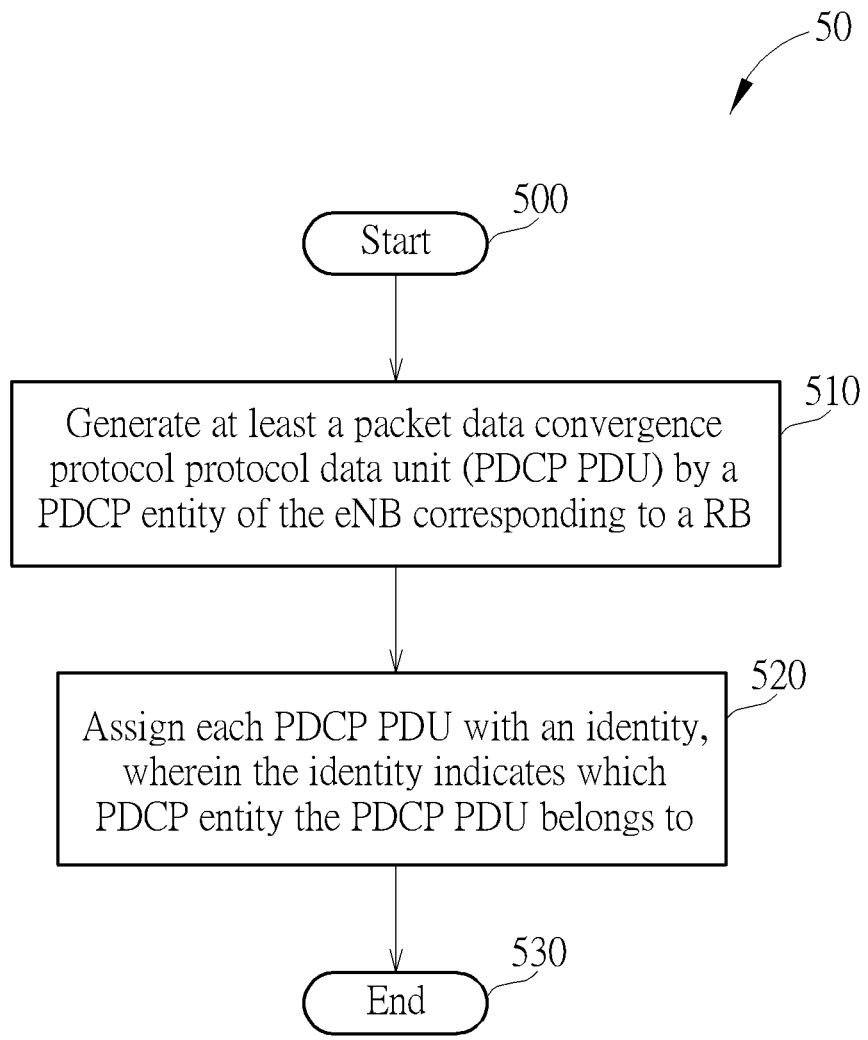
FIG. 5 is a flowchart of an exemplary process according to the present disclosure.

Please refer to FIG. 5, which is a flowchart of a process 50 according to an example of the present disclosure. The process 50 is utilized in the eNB of FIG. 3 for RB transmission. The process 50 may be compiled into a program code 414 to be stored in the storage unit 410, and may include the following steps:

Step 500: Start.

Step 510: Generate at least a packet data convergence protocol protocol data unit (PDCP PDU) by a PDCP entity of the eNB corresponding to a RB.

Step 520: Assign each PDCP PDU with an identity, wherein the identity indicates which PDCP entity the PDCP PDU belongs to.

Step 530: End.

According to the process 50, the eNB adds an identity to a PDCP PDU of a RB for RB transmission. The identity could be the RB ID, the PDCP entity ID or any ID that can uniquely identify a RB, to indicate which RB or PDCP entity the PDCP PDU belongs to. As a result, after the UE receives the PDCP PDU from the WiFi AP, the UE knows which PDCP entity the PDCP PDU shall route to.

The present invention provides a protocol architecture to support LTE-WLAN aggregation for RB transmission, but not to change the fundamental WiFi transmission technique (i.e. avoid IEEE 802.11 specification impacts). Please refer to FIG. 6, a new adaptor layer on eNB side is introduced for marking each PDCP PDU with an identity (i.e. a RB ID or a PDCP entity ID) of a RB (i.e. a split RB/assisted RB) and removing the PDCP PDU upon receiving the notification of successful delivery of the PDCP PDU from the WiFi AP. On the other hand, a new adaptor layer on the UE side is introduced for removing the identity of each marked PDCP PDU and delivering to the corresponding PDCP entity according to the identity. In addition, a new controller on the WiFi AP side is introduced for inform the eNB the successful delivery of PDCP PDU to the UE.

Figure 6:
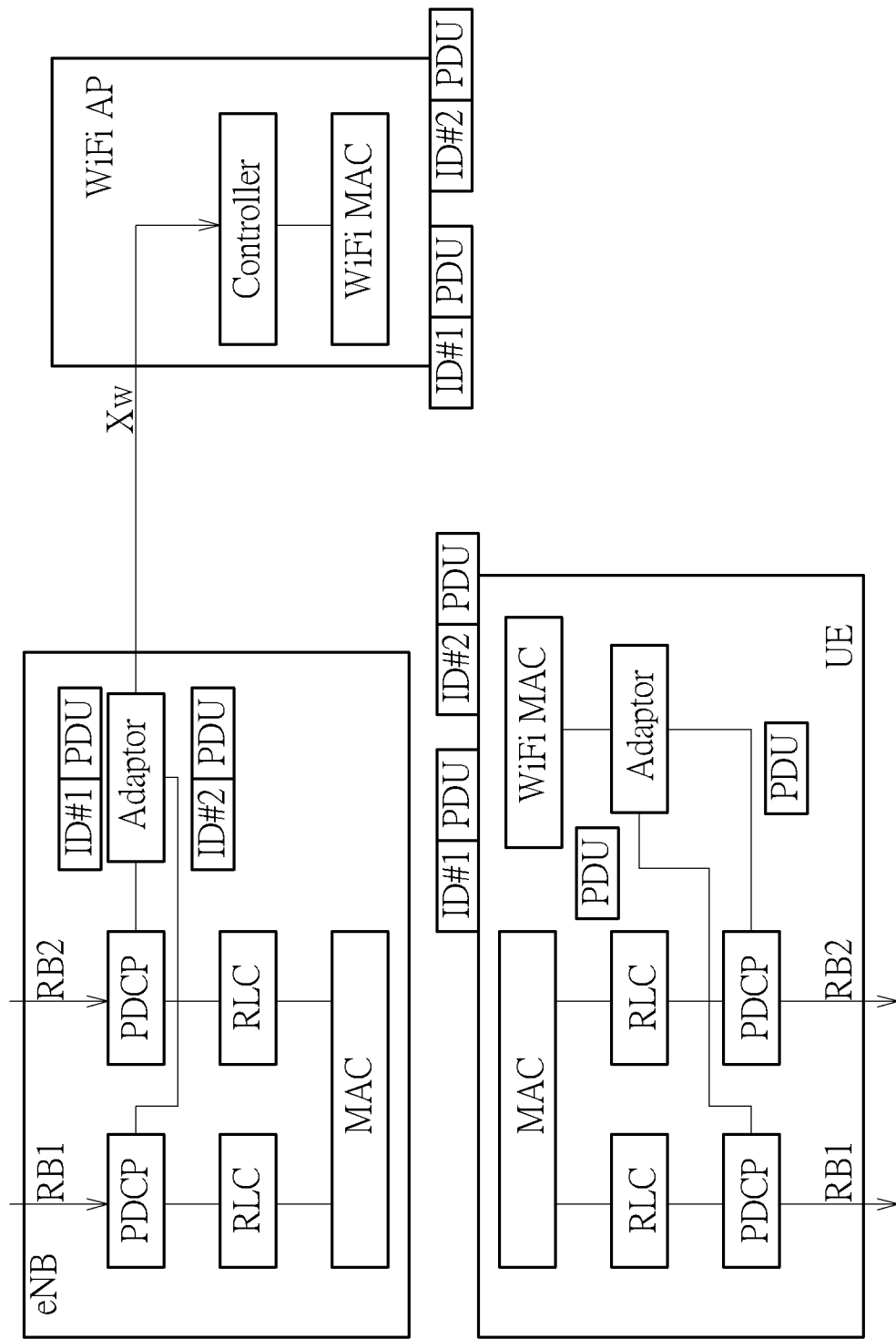
FIGS. 6-7 are schematic diagrams of protocol architecture according to the present disclosure.

Besides, in FIG. 6, there is a Xw interface between the eNB and the WiFi AP which can support the eNB for radio resource integration. For example, the eNB and the WiFi AP may exchange assisting information to each other via Xw interface, which includes SSID, BSSID, load, or throughput (periodically or by the eNB request) provided from the WiFi AP to the eNB, and load or throughput from the eNB to the WiFi AP. In addition, the eNB and the WiFi may send data (i.e. marked PDCP PDUs) and control message to each other on the Xw interface.

A split RB transmission is illustrated in FIG. 6. The eNB sends the marked PDCP PDUs (i.e. original PDCP PDU associated to the radio bearer RB1 with an additional identity ID #1 and original PDCP PDU associated to radio bearer RB2 with an additional identity ID #2 shown in FIG. 6) to the WiFi AP via the Xw interface. The WiFi AP then transmits those received marked PDCP PDUs to the UE, and informs the eNB the delivery of PDCP PDUs after successful delivering the marked PDCP PDUs to the UE. After the eNB is notified of successful delivery of PDCP PDUs, the eNB removes the PCDP PDUs from a buffer of the PDCP entity. On the other hand, after the UE receives the marked PDCP PDUs from the WiFi AP, the UE removes the identities ID #1-ID #2 from the marked PDCP PDUs and knows which PDCP entity the PDCP PDUs shall route to according to the identities ID #1-ID #2.

Figure 7:
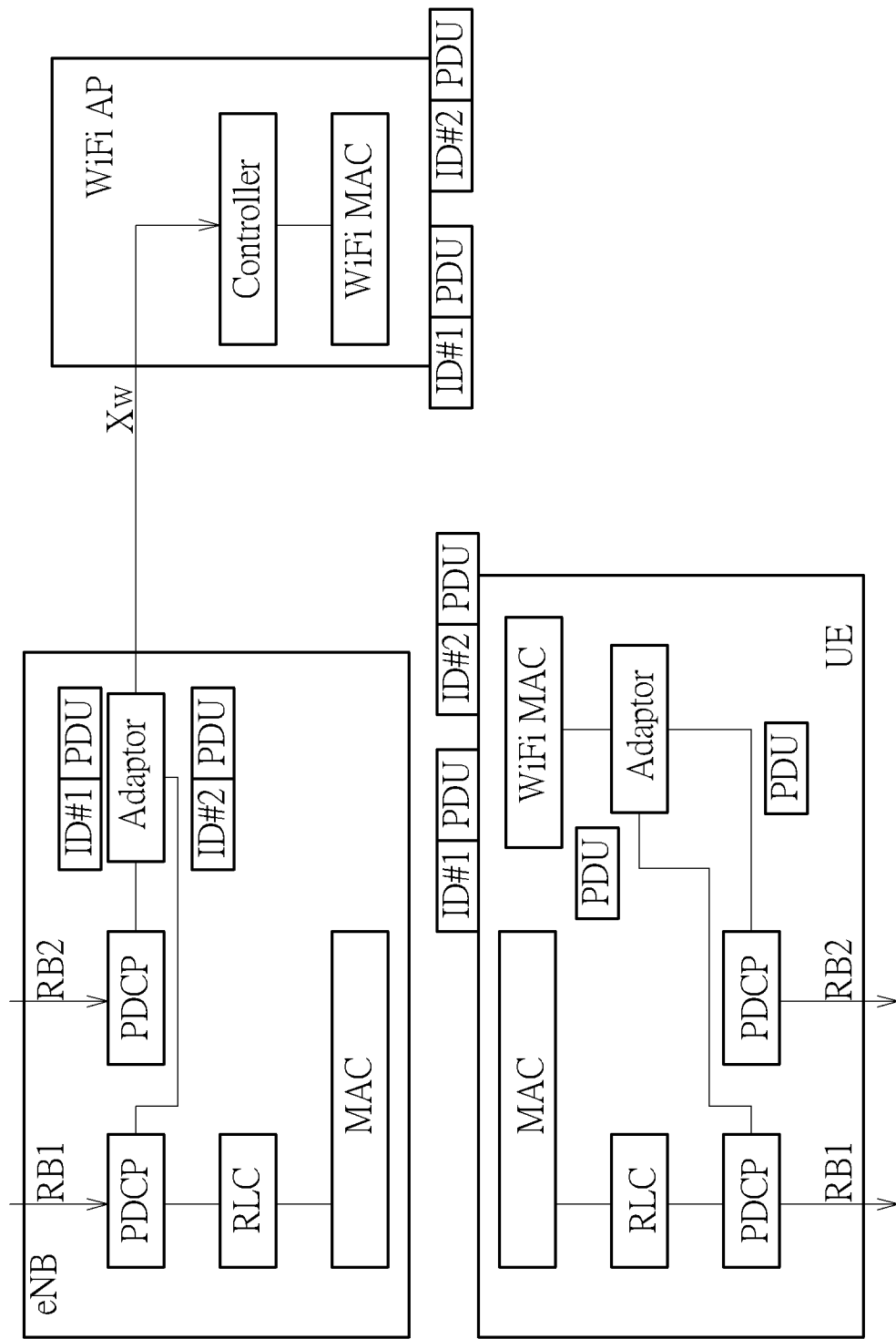

Refer to FIG. 7, which illustrates a split RB and an assisted RB transmission. In FIG. 7, radio bearer RB1 is a split bearer and radio bearer RB2 is an assisted RB. Similar to the abovementioned operation, the eNB assigns PDCP PDU associated to the radio bearer RB1 with identity ID #1 and PDCP PDU associated to the radio bearer RB2 with identity ID2, and then transmits to the UE via the WiFi AP. As a result, the UE knows which RB or PDCP entity the PDCP PDUs received from the WiFi AP belongs to, so as to deliver the PDCP PDUs to the right PDCP entity for reordering. In detail, since PDCP PDUs is transmitted on both LTE and WLAN, they may arrive at different times at the UE (namely a PDCP entity receives PDCP PDUs out of order). Therefore, a reordering function is needed for a split RB transmission so that the PDCP PDUs could be delivered to the upper layer in sequence.

Note that, since the eNB is an anchor node for controlling RB transmission, the eNB can directly indicate the RB type (i.e. a normal RB, a split RB or an assisted RB) for the UE to adopt the related protocol architecture and behavior (i.e. reordering function) for reception. Or, the eNB can change the RB type during RB transmission. For example, the eNB may decide to change the type of RB(s) based on the information such as "AP Discovery Report", "UE Location Report", "AP Measurement", or "AP Failure reports" from the UE or assisting information from the WiFi AP via the Xw interface. In this situation, the eNB may transmit an RB type change indication to the UE, the RB type change indication includes to-be-split, to-AP, and to-LTE, wherein "to-be-split" represents that the RB is configured as a split RB, "to-AP" represents that the RB is configured as an assisted RB, and "to-LTE" represents that the RB is configured as a normal RB. On the other hand, after the UE receives the RB type change indication from the eNB, the UE knows what protocol architecture and behavior shall be adopted. For example, when the UE receives "to-be-split" indication from the eNB, the UE adopts the radio protocol for a split RB and performs the reordering function in the receiving PDCP entity. When the UE receives "to-AP" indication, the UE adopts the radio protocol for an assisted RB but maybe not perform reordering function in the receiving PDCP entity. When the UE receives "to-LTE" indication, the UE adopts the regular LTE protocol.

Besides, for a split RB and an assisted RB transmission, the eNB shall request the WiFi AP for resource allocation for data transmission. In case of a WiFi AP with multiple carriers (i.e. FDM based), the WiFi AP broadcasts public SSID on one carrier, which is allowed for all UEs, and grants resources for split RB(s) or assisted RB(s) for the UE by giving the private SSID on another C2. In a case of WiFi AP with single carrier (TDM-Based), the WiFi AP broadcasts its public SSID on the carrier. However, not all the resource is open for all UEs. The WiFi AP would reserve some resources on the carrier for private resources grants.

Figure 8:
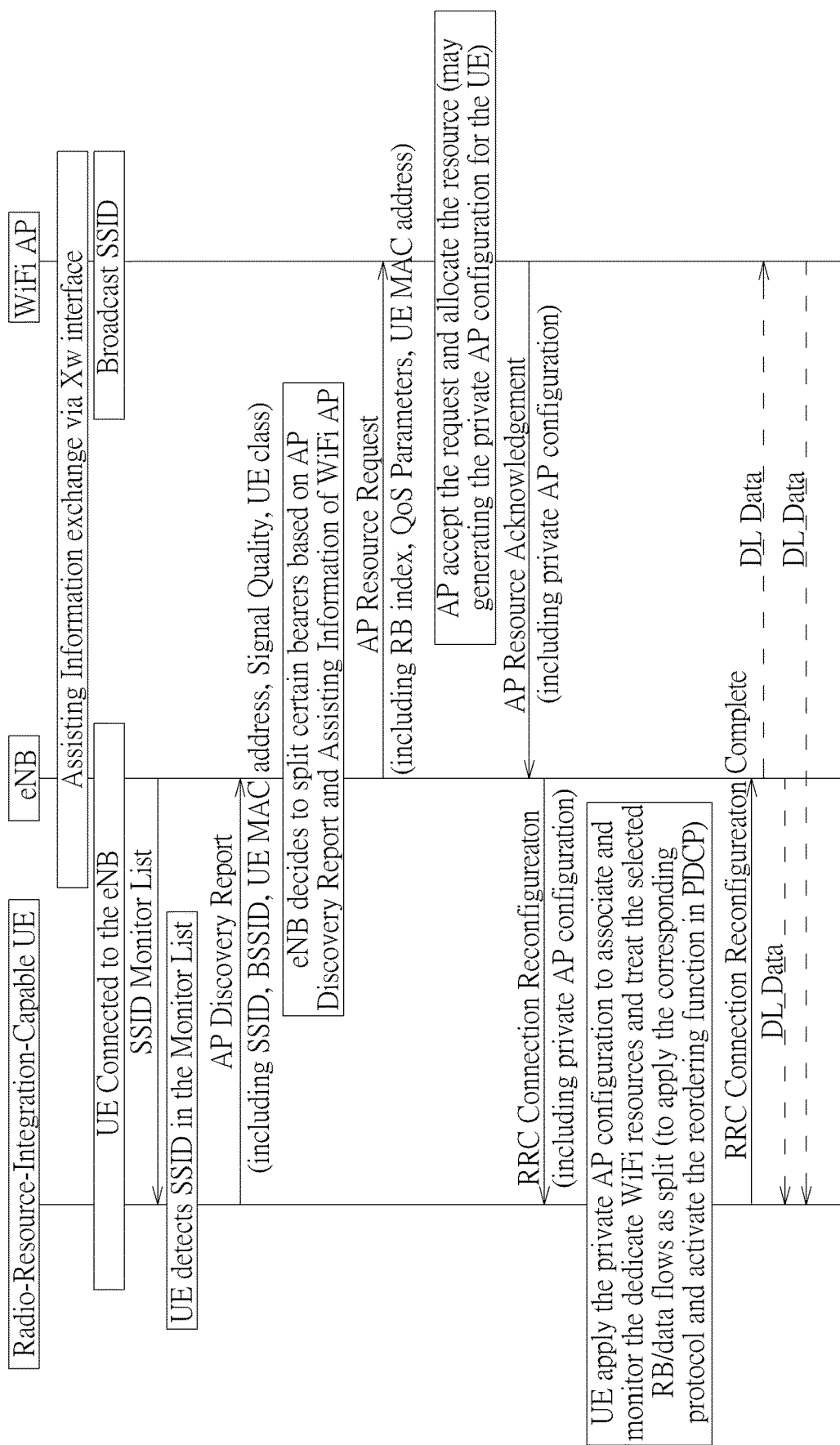
FIGS. 8-13 are schematic diagrams of a radio bearer transmission based on an AP discovery report.

Detailed operations are descripted as follows. Refer to FIG. 8 for an embodiment of WiFi AP resource request to a WiFi AP with multiple carriers. The Radio-Resource-Integration-Capable UE (namely the UE is able to access LTE network and WiFi network simultaneously) first connects to the eNB, and may inform its capabilities (whether it is Radio-Resource-Integration-Capable) to the eNB in a RRC connection procedure. After the UE is connected to the eNB, the eNB sends a SSID Monitor List to the UE, wherein the SSID Monitor List contains the SSID(s) of the WiFi AP(s) that the eNB can request the resource for split bearer(s). Note that, WiFi AP with SSID in the SSID Monitor List may have higher priorities. Upon receiving the SSID Monitor List, the UE checks that whether it detects any SSID in the SSID Monitor list. If there is at least one of the SSID in the SSID Monitor List detected by the UE, the UE sends the AP Discovery Report to the eNB, wherein the AP Discovery Report may include at least a SSID and/or a BSSID of a AP selected by the UE, UE MAC address, signal quality corresponding to a selected AP, and/or UE class. The AP Discovery Report may be sent periodically or by event-triggered (e.g. when a WiFi AP is added to/removed from the WiFi AP list in the previous AP Discovery Report). There could be different ways for the UE to report the AP Discovery Report. The UE scans the frequencies and select one WiFi AP to perform the authentication and the association procedures. After successful AP selection, the UE send the AP Discovery Report (related to the selected AP) to the eNB if the SSID of this selected AP is in the SSID Monitor List. Alternatively, after successful authentication, the UE send the AP Discovery Report to the eNB that may contain the information of more than one AP. For example, the UE shall report all the BSSID(s) of WiFi AP (s) with the signal quality above the given threshold. In this alternative, the eNB may need to configure the threshold value in the SSID Monitor List or by broadcasting. Upon receiving the AP Discovery Report, the eNB would decide whether or not to using WiFi AP resources for certain bearers based on AP Discovery Report and/or Assisting Information of WiFi AP. Once the eNB decides to split certain bearers, the eNB sends the AP Resource Request to the WiFi AP, wherein the AP Resource Request may include RB index(s), corresponding QoS Parameters, and UE MAC address. Once the WiFi AP accepts the request from the eNB, the WiFi AP sends back the AP Resource Acknowledgement which includes a Private AP Configuration generating by the WiFi AP for granting the WiFi AP resource. The Private AP Configuration may include the private SSID, central frequency, bandwidth for the UE, security info (such as keys, algorithm, etc.) for association, and IP address of the UE. Upon receiving the AP Resource Acknowledgement, the eNB send the RRC-ConnectionReconfiguration includes Radio Resource Configuration for split bearer, Private AP Configuration (deriving from the AP Resource Acknowledgement) together with the DC-RB-type-change indication (to-be-split) to the UE to configure the split bearer (s). Upon receiving the RRCConnectionReconfiguration containing the Radio Resource Configuration for split bearer, Private AP Configuration (deriving from the AP Resource Acknowledgement), and DC-RB-type-change indication (to-be-split) from the eNB, the UE apply the configurations to setup the split bearer (s). For example, the UE applies the private AP configuration to associate and monitor the dedicate WiFi resources and treat the selected RB/data flows as split (to apply the corresponding protocol for the split bearer and activate the reordering function in PDCP). Note that the UE may need to perform authentication procedure before performing association if the private AP configuration is related to another WiFi AP, not the currently WiFi AP the UE performed authentication to. After successful reconfigurations, the UE sends the RRCConnectionReconfigurationComplete to the eNB. Upon receiving the RRCConnectionReconfigurationComplete, the eNB starts transmitting part of the data to UE and transmitting part of the data via Xw to WiFi AP. WiFi AP transmits those received data to the UE according to the resource allocation granted and the UE would receive the data at the granted resource.

Figure 9:
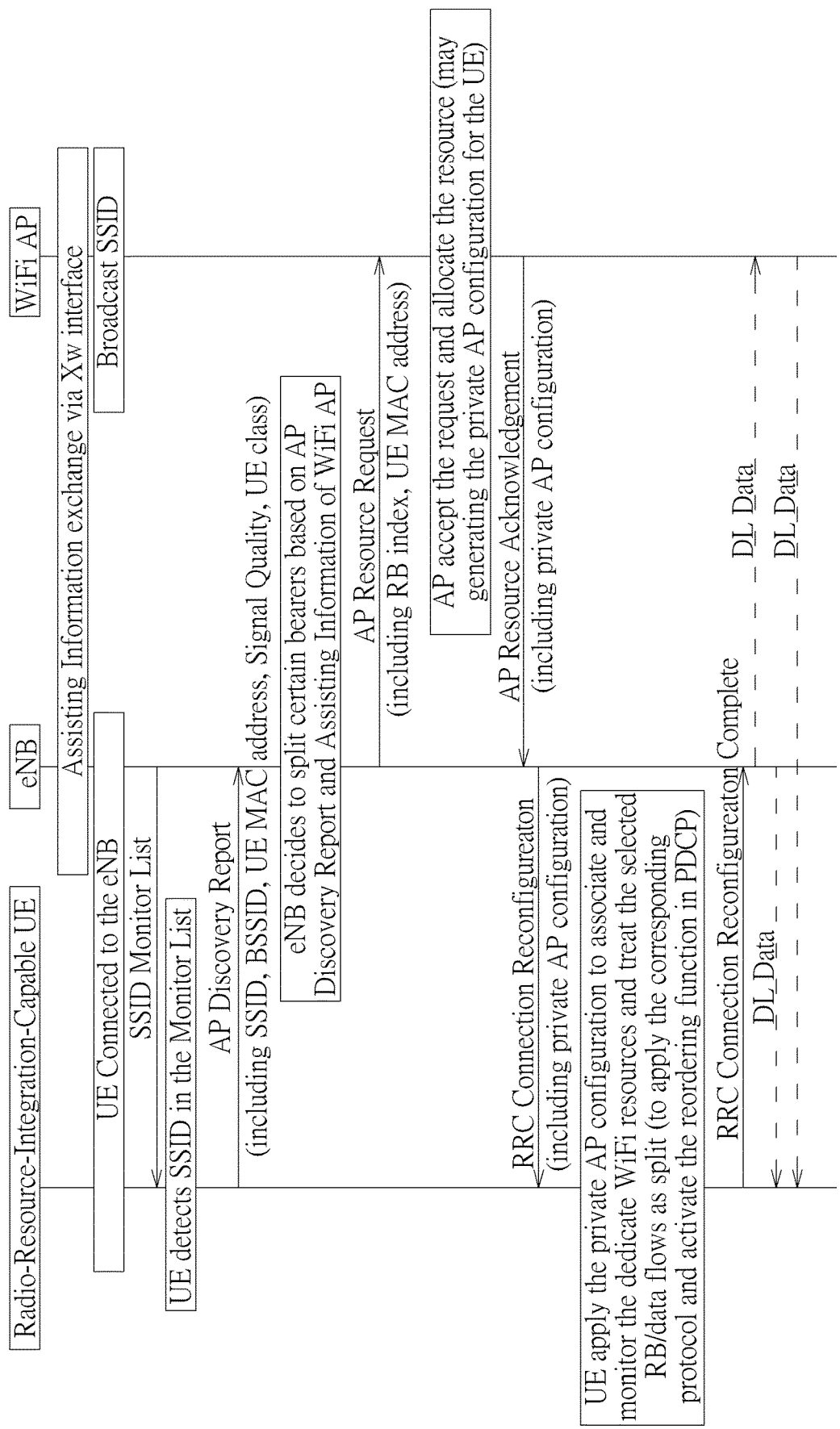

Refer to FIG. 9, compared to FIG. 8, once the eNB decides to split certain bearers, the eNB sends the AP Resource Request to the WiFi AP. The AP Resource Request may include RB index(s), and UE MAC address. In this embodiment, all the UE with split/assisted RBs may share the common reserved WiFi resource.

Figure 10:
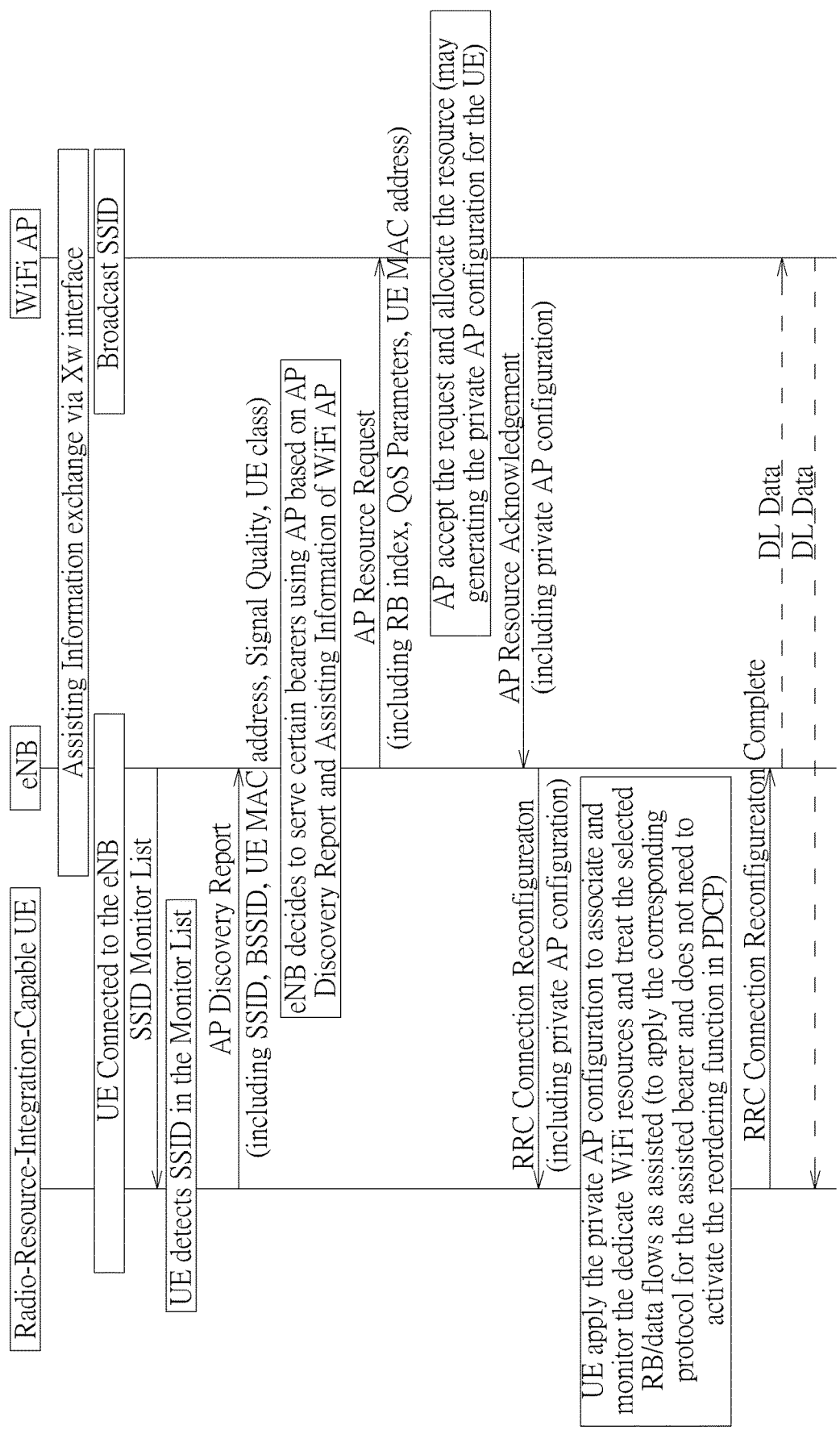

Refer to FIG. 10, compared to FIG. 8, once the eNB decides to serve certain bearers by WiFi AP, the eNB sends the AP Resource Request to the WiFi AP. The AP Resource Request may include RB index(s), corresponding QoS Parameters, and UE MAC address. Upon receiving the AP Resource Acknowledgement, the eNB send the RRCConnectionReconfiguration includes Radio Resource Configuration for assisted bearer, Private AP Configuration (deriving from the AP Resource Acknowledgement) together with the DC-RB-type-change indication (to-AP) to the UE to configure the assisted bearer(s). Upon receiving the RRCConnectionReconfiguration containing the Radio Resource Configuration for assisted bearer, Private AP Configuration (deriving from the AP Resource Acknowledgement), and DC-RB-type-change indication (to-AP) from the eNB, the UE apply the configurations to setup the assisted bearer(s). For example, the UE applies the private AP configuration to associate and monitor the dedicate WiFi resources and treat the selected RB/data flows as assisted (to apply the corresponding protocol for the assisted bearer and does not need to activate the reordering function in PDCP). Note that the UE may need to perform authentication procedure before performing association if the private AP configuration is related to another WiFi AP, not the currently WiFi AP the UE performed authentication to. Upon receiving the RRCConnectionReconfigurationComplete, the eNB starts transmitting all the data (of the assisted RB (s)) via Xw to WiFi AP. WiFi AP transmits those received data to the UE according to the resource allocation granted and the UE would receive the data at the granted resource.

Figure 11:
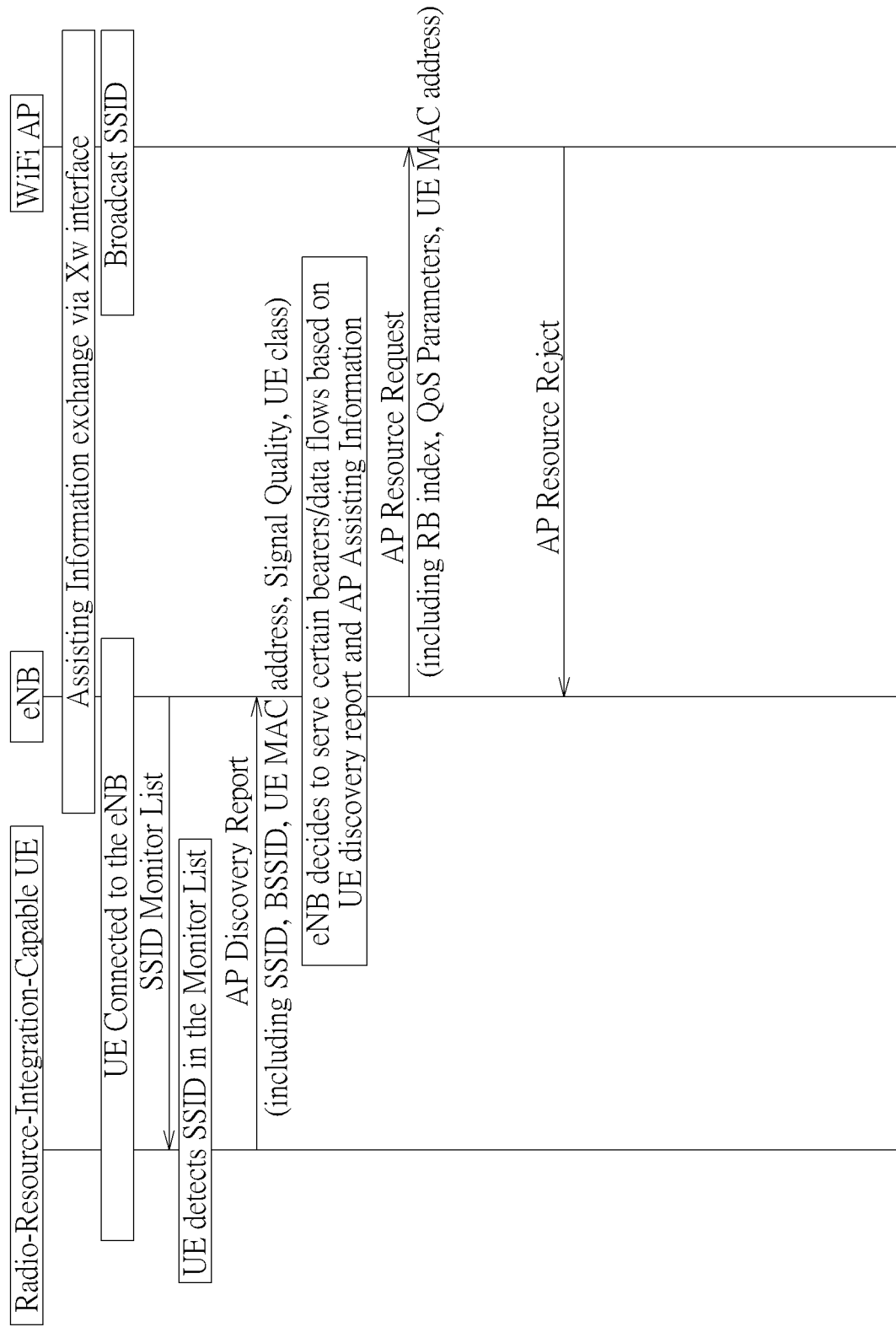

Refer to FIG. 11, compared to FIG. 8, once the eNB decides to split certain bearers, the eNB sends the AP Resource Request to the WiFi AP. However, the WiFi AP rejects the request from the eNB, and sends back the AP Resource Reject.

Figure 12:
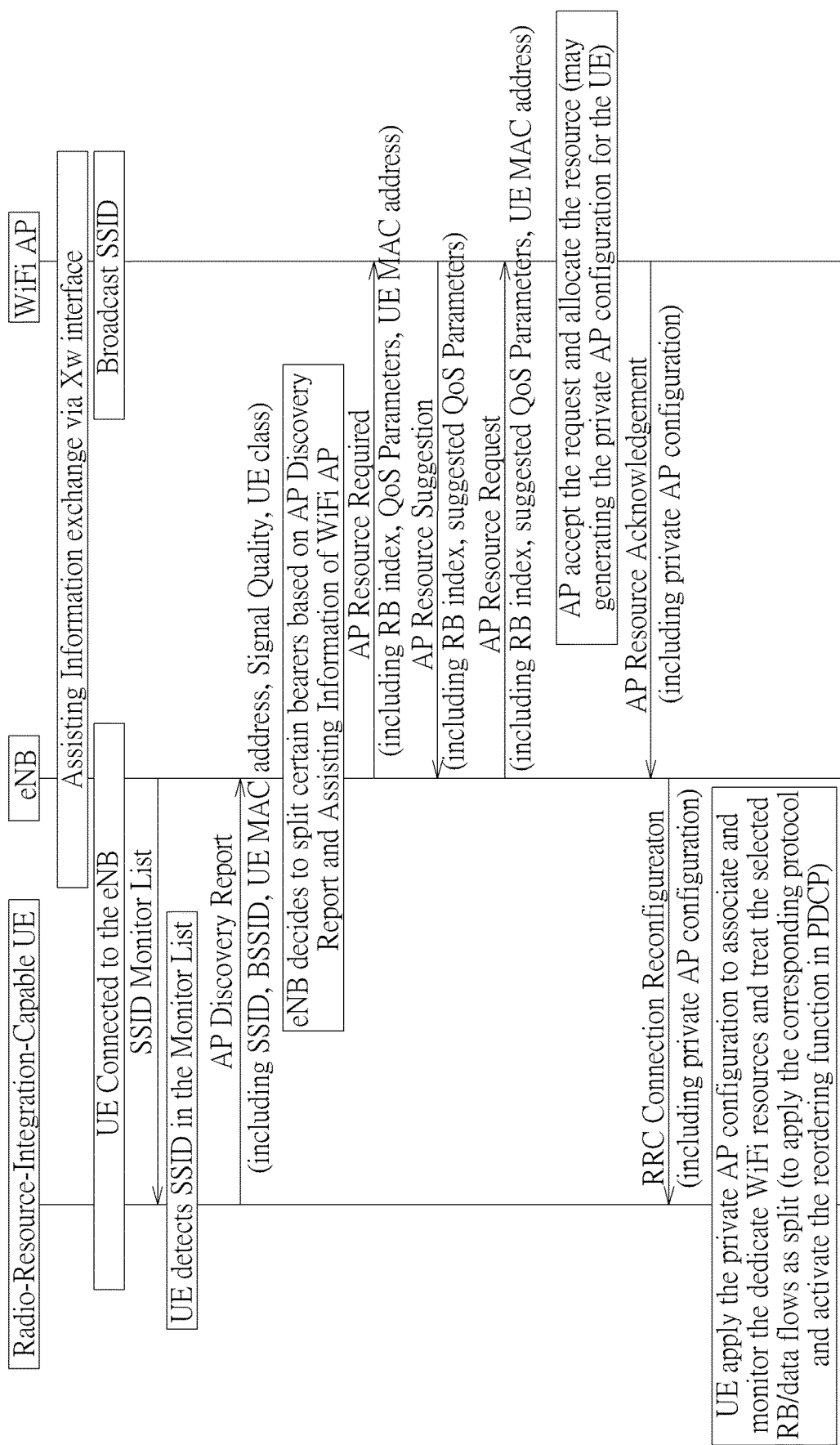

Refer to FIG. 12, compared to FIG. 8, once the eNB decides to split certain bearers, the eNB sends the AP Resource Required to the WiFi AP, wherein the AP Resource Required may include RB index(s), corresponding QoS Parameters, and UE MAC address. Once the WiFi AP receives the AP Resource Required message from the eNB, the WiFi AP sends back the AP Resource Suggestion, which includes suggested QoS parameters (per RB). Upon receiving the AP Resource Suggestion message and accepts the suggested QoS parameters, the eNB sends the AP Resource Request to the WiFi AP. Once the WiFi AP accepts the request from the eNB, the WiFi AP sends back the AP Resource Acknowledgement.

Figure 13:
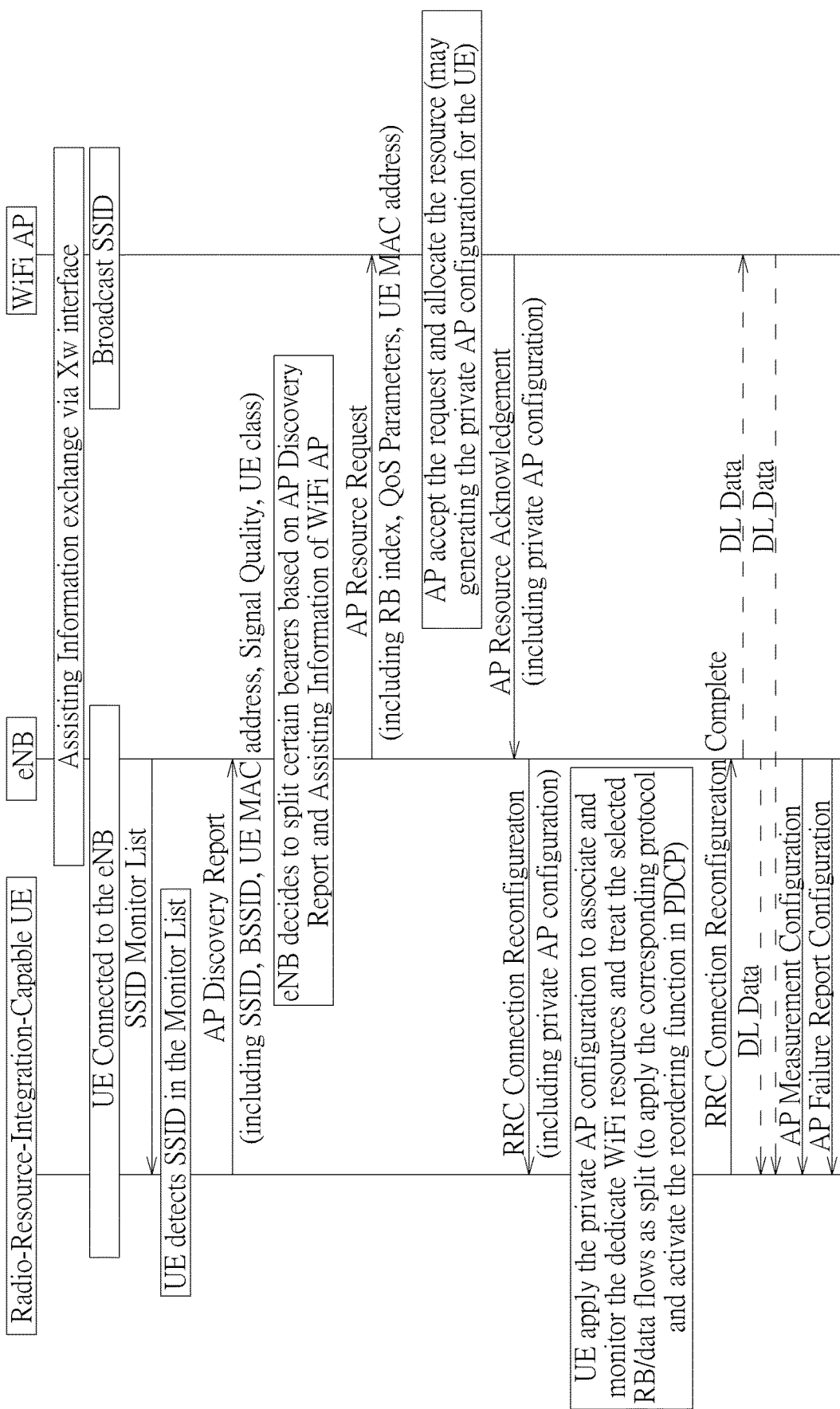

Please refer to FIG. 13 for an embodiment of WiFi AP resource request to a WiFi AP with single carrier. Compared to FIG. 8, once the WiFi AP accepts the request from the eNB, the WiFi AP sends back the AP Resource Acknowledgement, which includes the Private AP Configuration generating by the WiFi AP for granting the WiFi resource. The Private AP Configuration includes not only the private SSID, central frequency, bandwidth for the UE, security info (such as keys, algorithm, etc.), IP address of the UE, but also time patterns. Besides, the eNB may transmit the AP Measurement Configuration and/or AP Failure Report configuration to gather the information of the using of WiFi AP resource (in the same RRCConnectionReconfiguration message or in other messages). The AP Measurement Configuration may include a measurement type, thresholds (for event-triggered report), period (for periodically report) and the AP Failure Report Configuration may include thresholds of WiFi AP signal quality and/or throughput and Number and timer of attempts to associate with the WiFi AP. According to the AP measurement report and/or AP Failure report, the eNB may decide whether or not to reconfigure the UE (e.g. not to use WiFi AP resource and direct the UE to use another WiFi AP resource).

Figure 14:
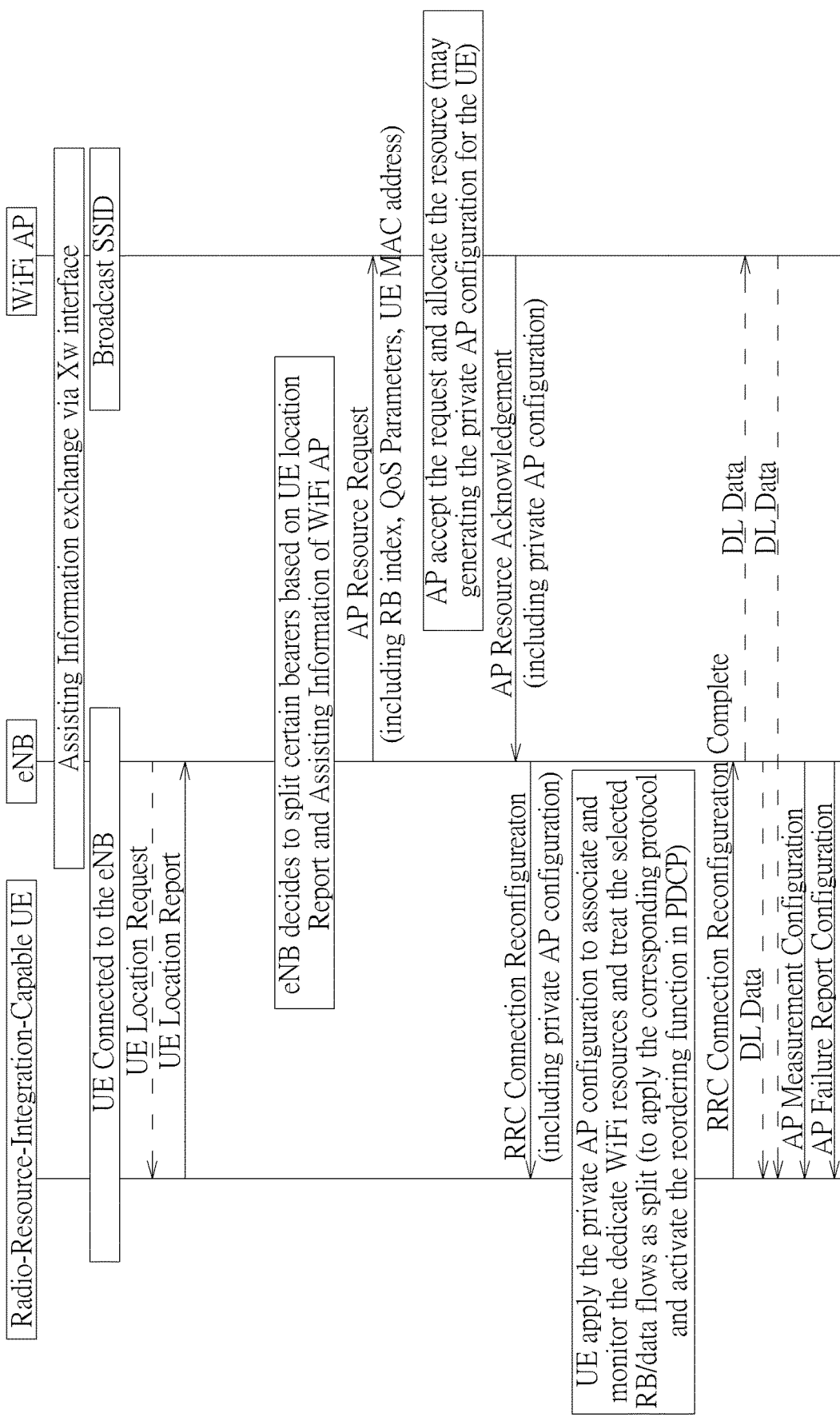
FIGS. 14-15 are schematic diagrams of a radio bearer transmission based on UE location report.
Figure 15:
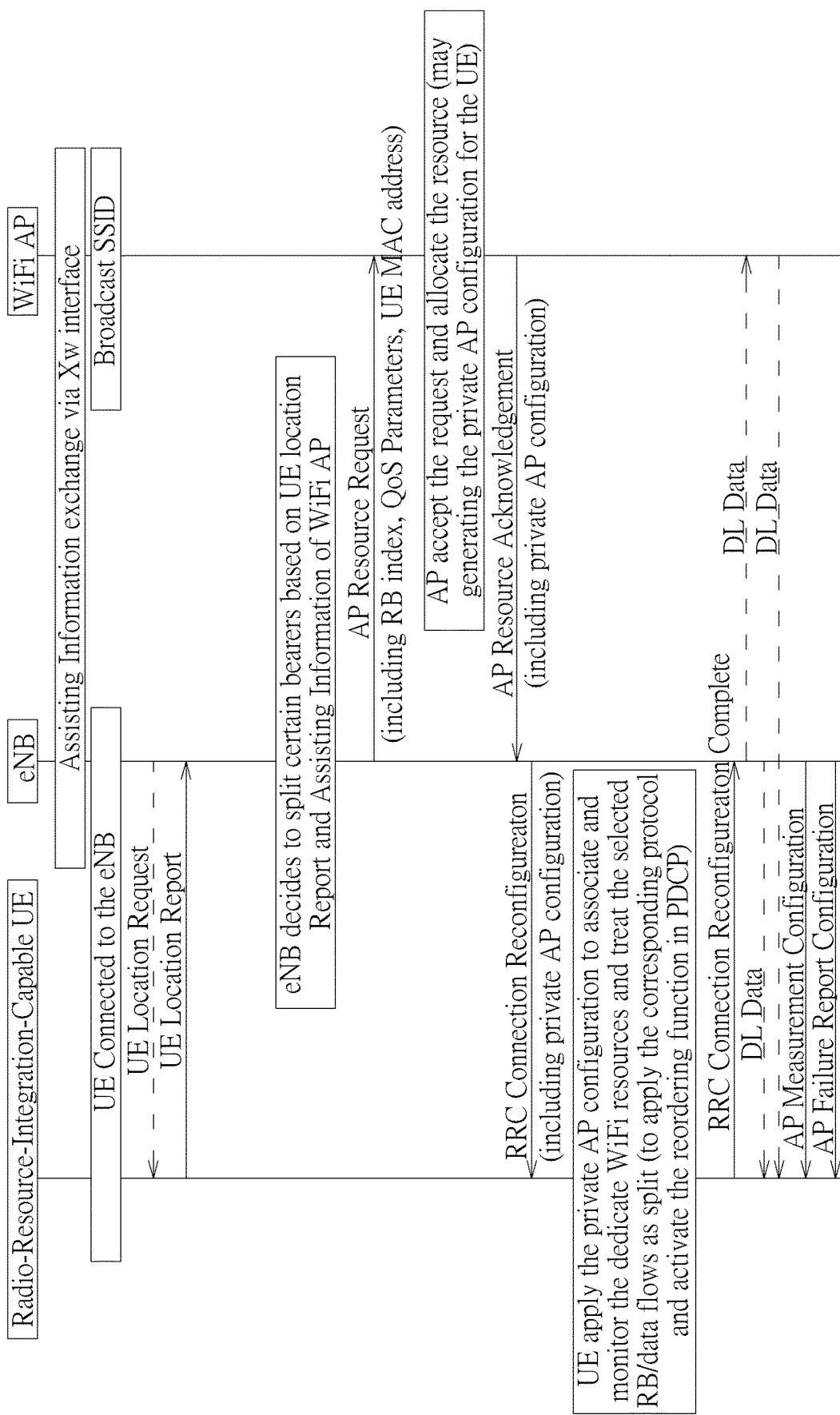

FIGS. 8-13 illustrate that the eNB decides whether to split or assist RBs by using AP resources or determines a RB type based on the AP Discovery Report from the UE. Differ to FIGS. 8-13, FIGS. 14-15 illustrate that the eNB decides whether to split certain bearers by using AP resources based on UE Location Report from the UE. In FIG. 14, the AP Resource Request is sent from the eNB to the WiFi AP with multiple carriers for resource allocation, and in FIG. 15, the AP Resource Request is sent to the WiFi AP with single carrier. As a result, once the WiFi AP accept the request, the WiFi AP feedbacks the Private AP Configuration including not only the private SSID, central frequency, bandwidth for the UE, security info (such as keys, algorithm, etc.), IP address of the UE, but also time patterns for association.

Figure 16:
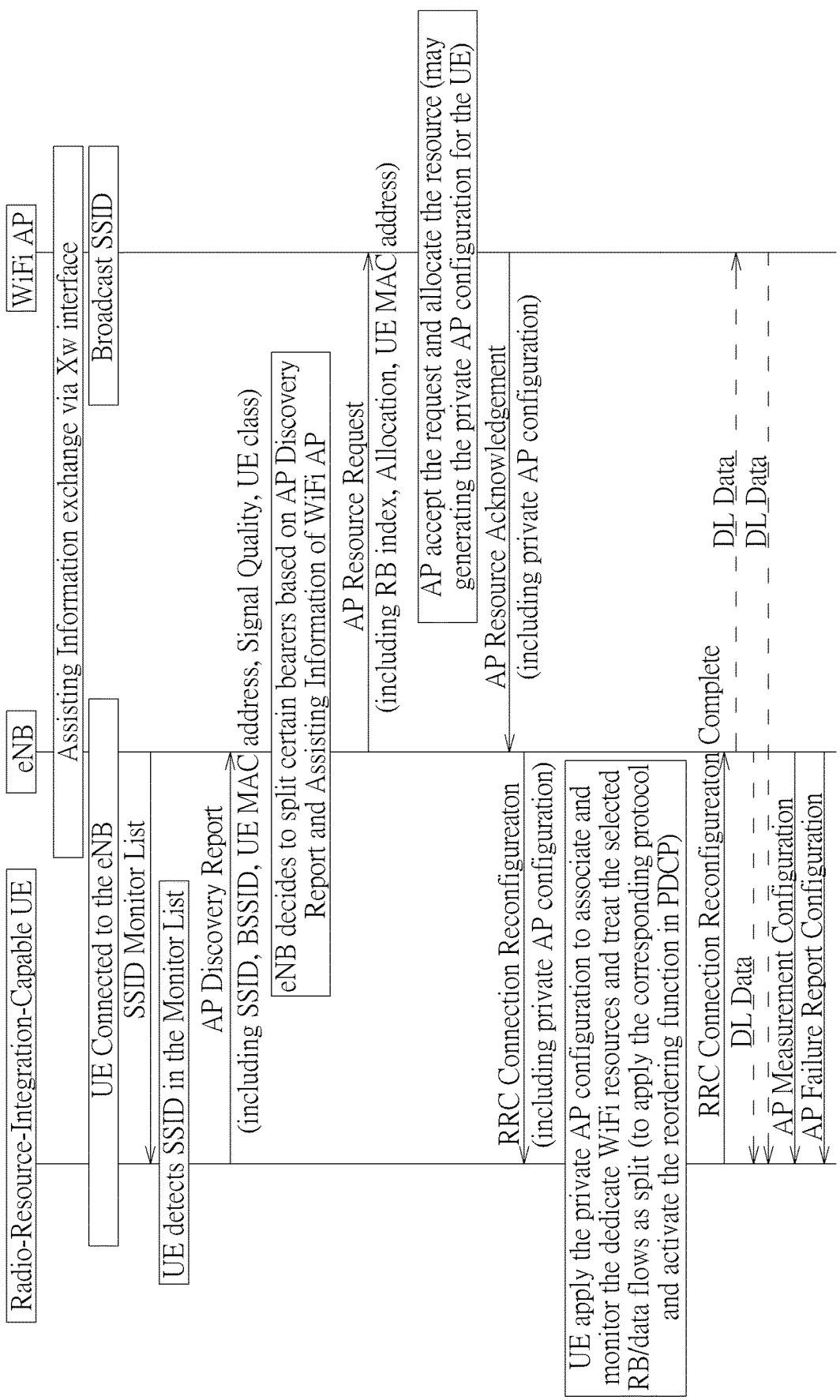
FIG. 16 is a schematic diagram of AP resource allocation by eNB according to the present disclosure.

Refer to FIG. 16, compared to FIG. 8, once the eNB decides to split certain bearers, the eNB may send the AP Resource Request to the WiFi AP. Note that, in this embodiment, the eNB and the WiFi AP may negotiate the reserved/granted WiFi resource for split/assisted RBs in advance such that the eNB could assign these WiFi resource directly without the further approval of WiFi AP. Simultaneously, the eNB send the RRCConnectionReconfiguration includes Radio Resource Configuration for split bearer, Private AP Configuration (generated by AP) together with the DC-RB-type-change indication (to-be-split) to the UE to configure the split bearer(s).

Figure 17:
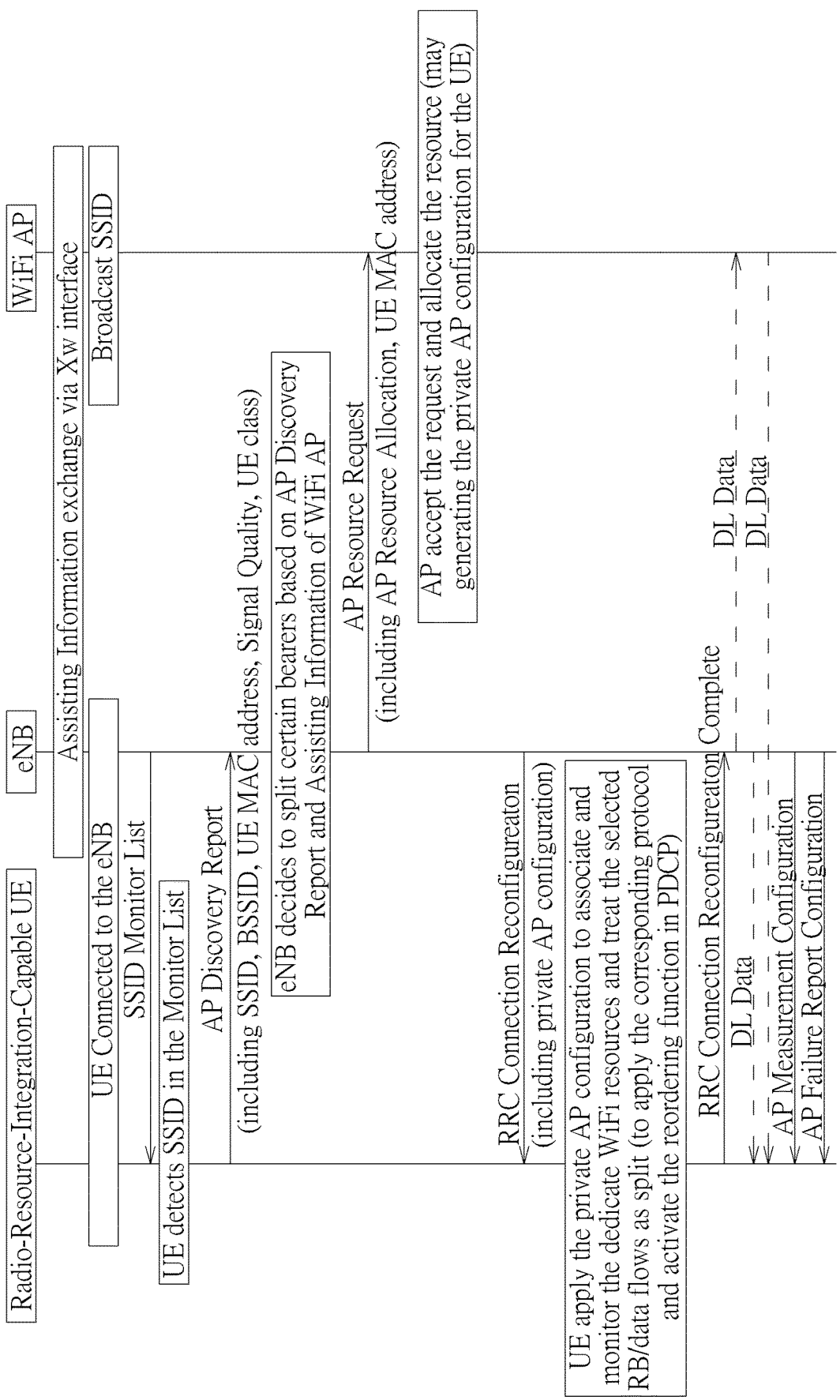
FIG. 17 is a schematic diagram of AP resource allocation by eNB according to the present disclosure.

Refer to FIG. 17, compared to FIG. 16, the eNB send the RRCConnectionReconfiguration includes Radio Resource Configuration for split bearer, Private AP Configuration (generated by eNB) together with the DC-RB-type-change indication (to-be-split) to the UE to configure the split bearer(s).

Figure 18:
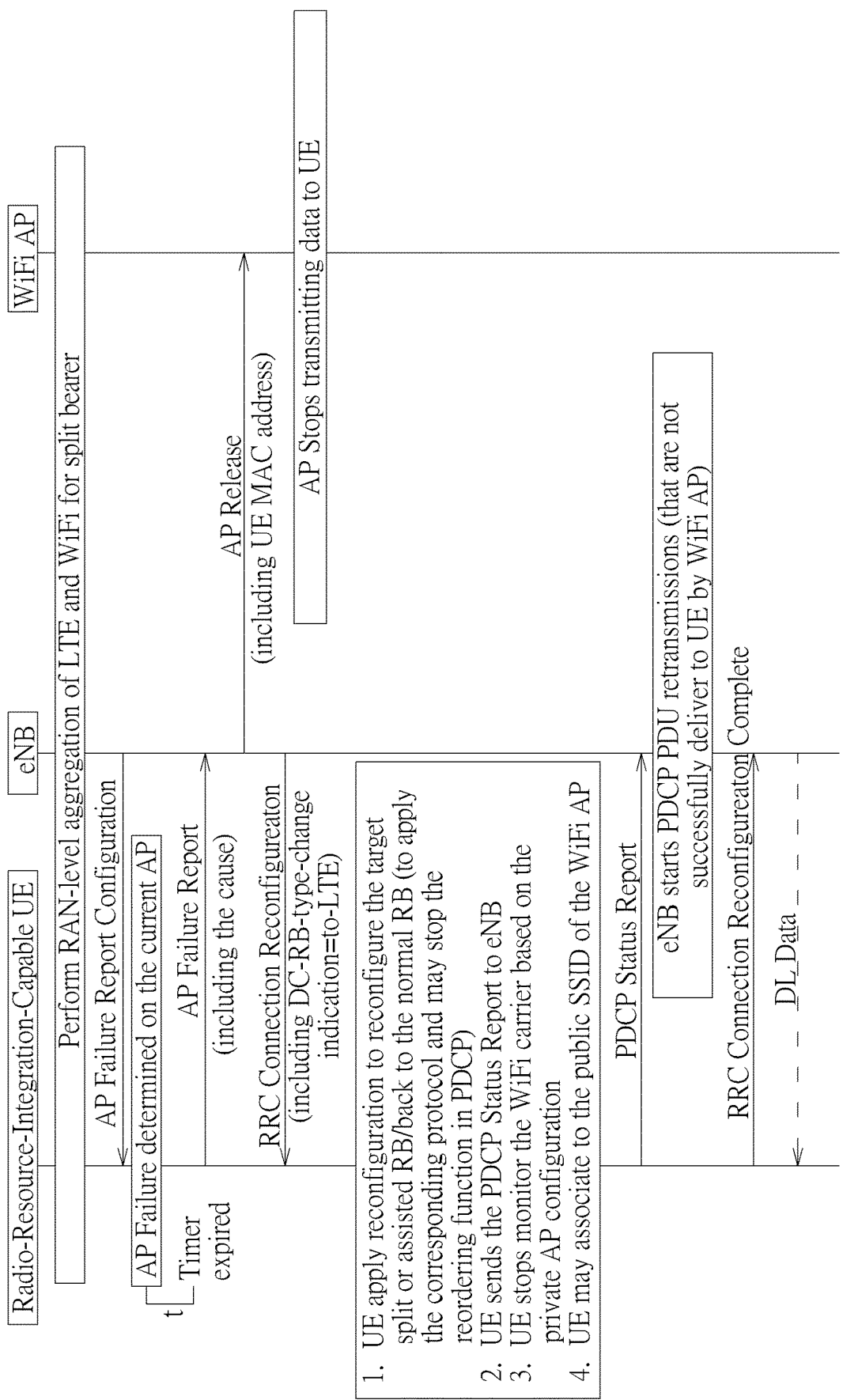
FIG. 18 is a schematic diagram of AP connection failure according to the present disclosure.

Please refer to FIG. 18, which illustrates an embodiment of AP connection failure. For the UE with split/assisted RB(s), the eNB may transmit the AP Failure Report configuration to the UE, wherein the AP Failure Report Configuration may include thresholds of WiFi AP signal quality and/or throughput, and/or number and timer of attempts to associate with the WiFi AP. Once the UE detected AP Failure happened according to the parameters/values provided in the AP Failure Report Configuration, the UE send the AP Failure Report to the eNB, wherein the AP Failure Report may include the cause of AP Failure (i.e. bad WiFi signal quality, UE turns off WiFi (e.g., due to low power) or association failure) and/or the latest measurement results of the associated WiFi AP. Upon receiving the AP Failure Report from the UE, the eNB would send the AP Release command to the WiFi AP for notification. Upon receiving the AP Release command, the WiFi AP would stop the data transmission to the UE. While the eNB sends the AP Release command to the WiFi AP, the eNB would also send the RRCConnectionReconfiguration includes the release of Private AP Configuration together with the DC-RB-type-change indication (to-LTE) to the UE to switch the split/assisted bearer(s) to normal (LTE) RBs. Upon receiving the RRCConnectionReconfiguration containing the release of Private AP Configuration together with the DC-RB-type-change indication (to-LTE), the UE apply the configurations to setup the normal bearer(s). For example, the UE applies reconfigurations to reconfigure the target split/assisted RBs back to the normal RB(s) (to apply the corresponding protocol for the normal bearer and may deactivate the reordering function in PDCP). The UE may send the PDCP Status Report to eNB and may stop monitor the WiFi carrier(s) based on the previous private AP configuration. The UE may then associate to the (public) SSID of the WiFi AP. After successful reconfigurations, the UE sends the RRCConnectionReconfigurationComplete to the eNB. Upon receiving the PDCP Status Report, the eNB starts retransmitting the data to the UE based on the PDCP Status Report.

Figure 19:
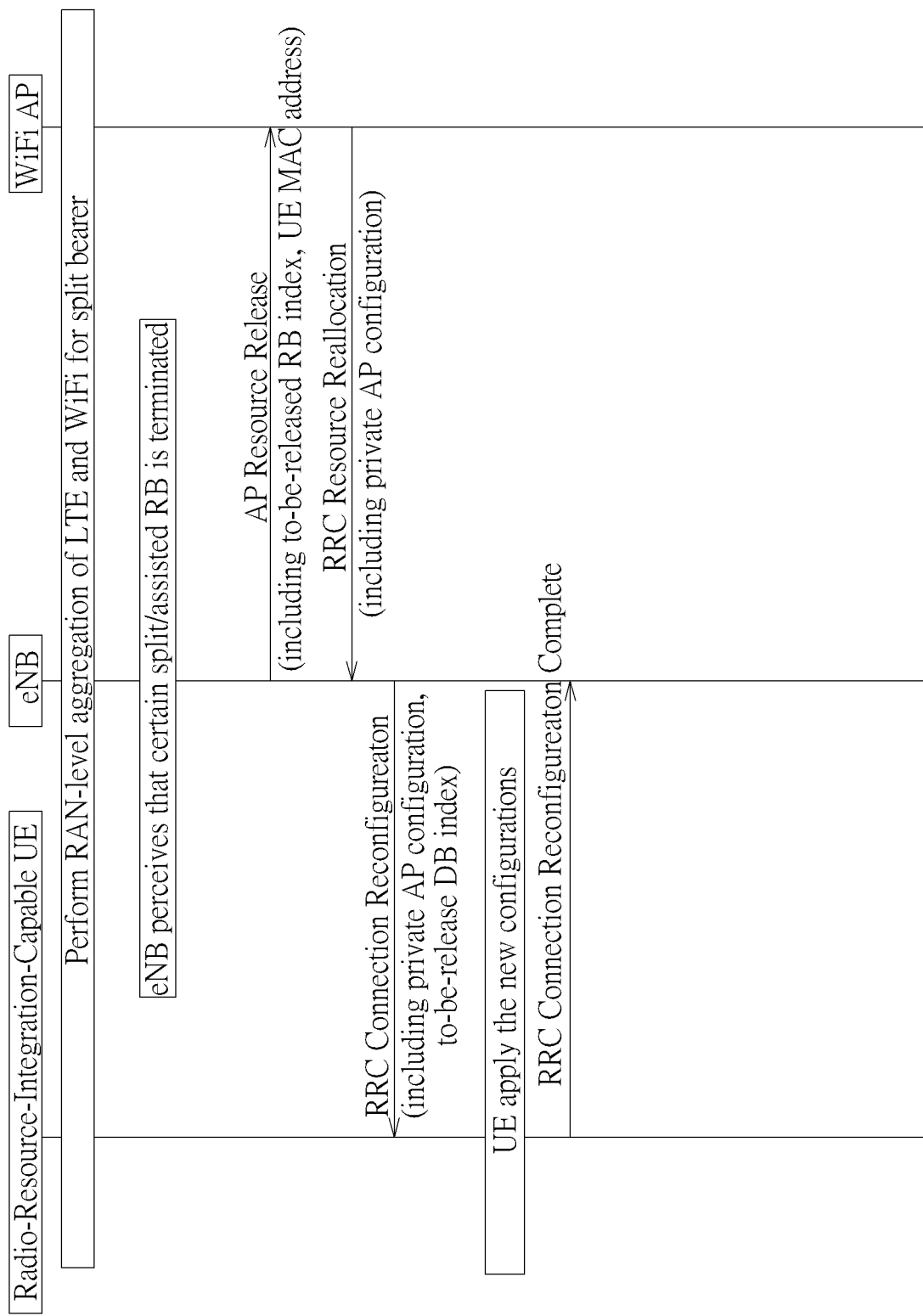
FIG. 19 is a schematic diagram of AP resource release according to the present disclosure.

Please refer to FIG. 19, which illustrates an embodiment of WiFi AP resource release due to bearer release. Once the eNB found that certain split/assisted RB(s) is terminated, the eNB may send the AP Resource Release to the WiFi AP, wherein the AP Resource Release may include to-be-released RB index and UE MAC address. Upon receiving the AP Resource Release, the WiFi AP sends the AP Resource Reallocation to the eNB including the new private AP configuration (if needed). Upon receiving the AP Resource Reallocation, the eNB sends the RRCConnectionReconfiguration includes the new Private AP Configuration together with the to-be-released RB index to the UE. Upon receiving the RRCConnectionReconfiguration containing the new Private AP Configuration together with the to-be-released RB index, the UE releases the corresponding RB(s) and apply the new Private AP configuration.

Figure 20:
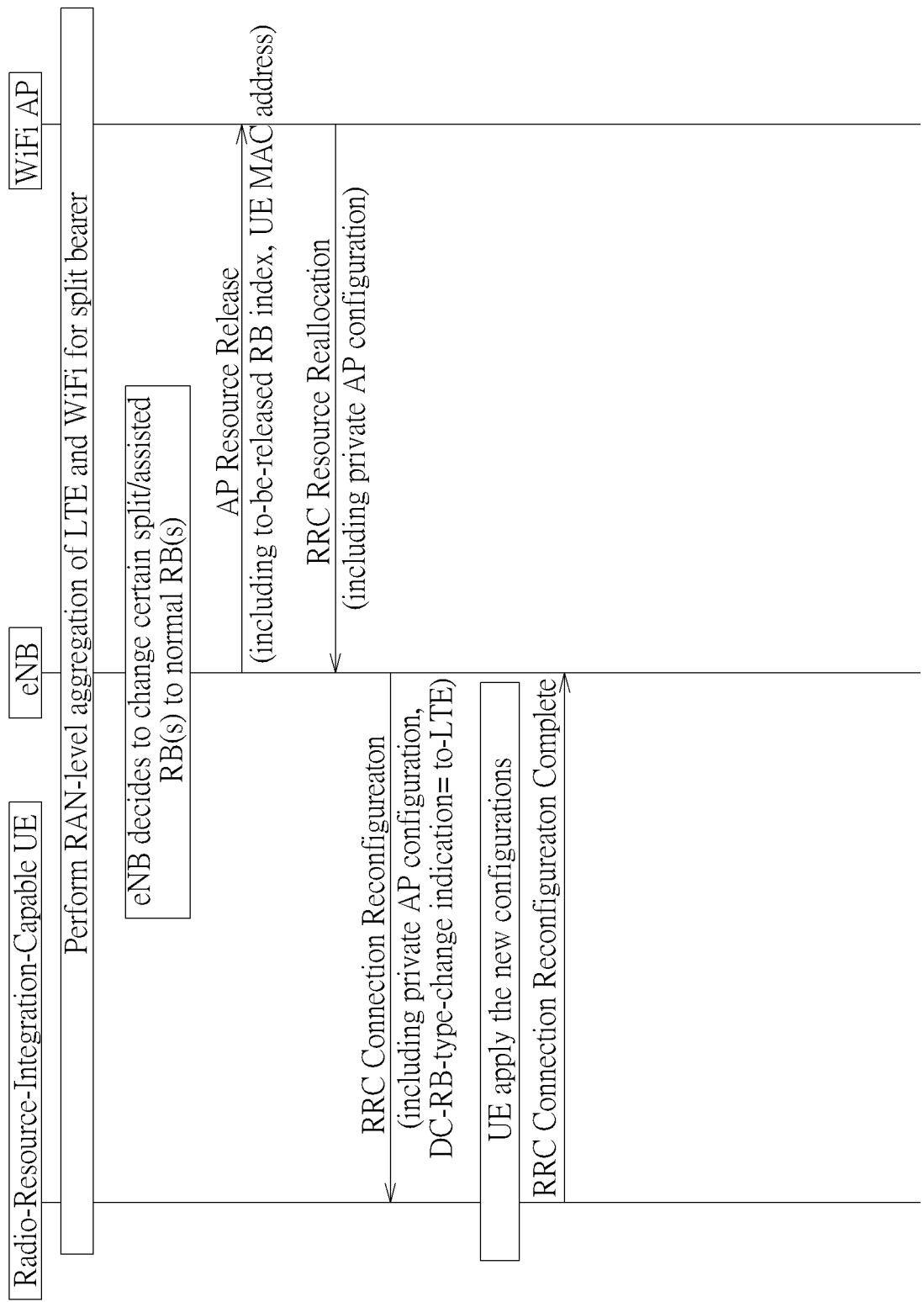
FIG. 20 is a schematic diagram of AP resource release due to bearer type change according to the present disclosure.

Please refer to FIG. 20, which illustrates an embodiment of WiFi AP resource release due to bearer type change. Once the eNB decides to change certain split/assisted RB(s) to normal RB(s) (for example, according to the AP measurement reports), the eNB may send the AP Resource Release to the WiFi AP, wherein the AP Resource Release may include to-be-released RB index and UE MAC address. Upon receiving the AP Resource Release, the WiFi AP sends the AP Resource Reallocation to the eNB including the new private AP configuration if needed. Upon receiving the AP Resource Reallocation, the eNB sends the RRCConnection-Reconfiguration includes the new Private AP Configuration together with the DC-RB-type-change indication (to-LTE) to the UE. Upon receiving the RRCConnectionReconfiguration containing the new Private AP Configuration together with the DC-RB-type-change indication (to-LTE) to the UE to configure the normal bearer(s) and apply the new Private AP configuration.

Figure 21:
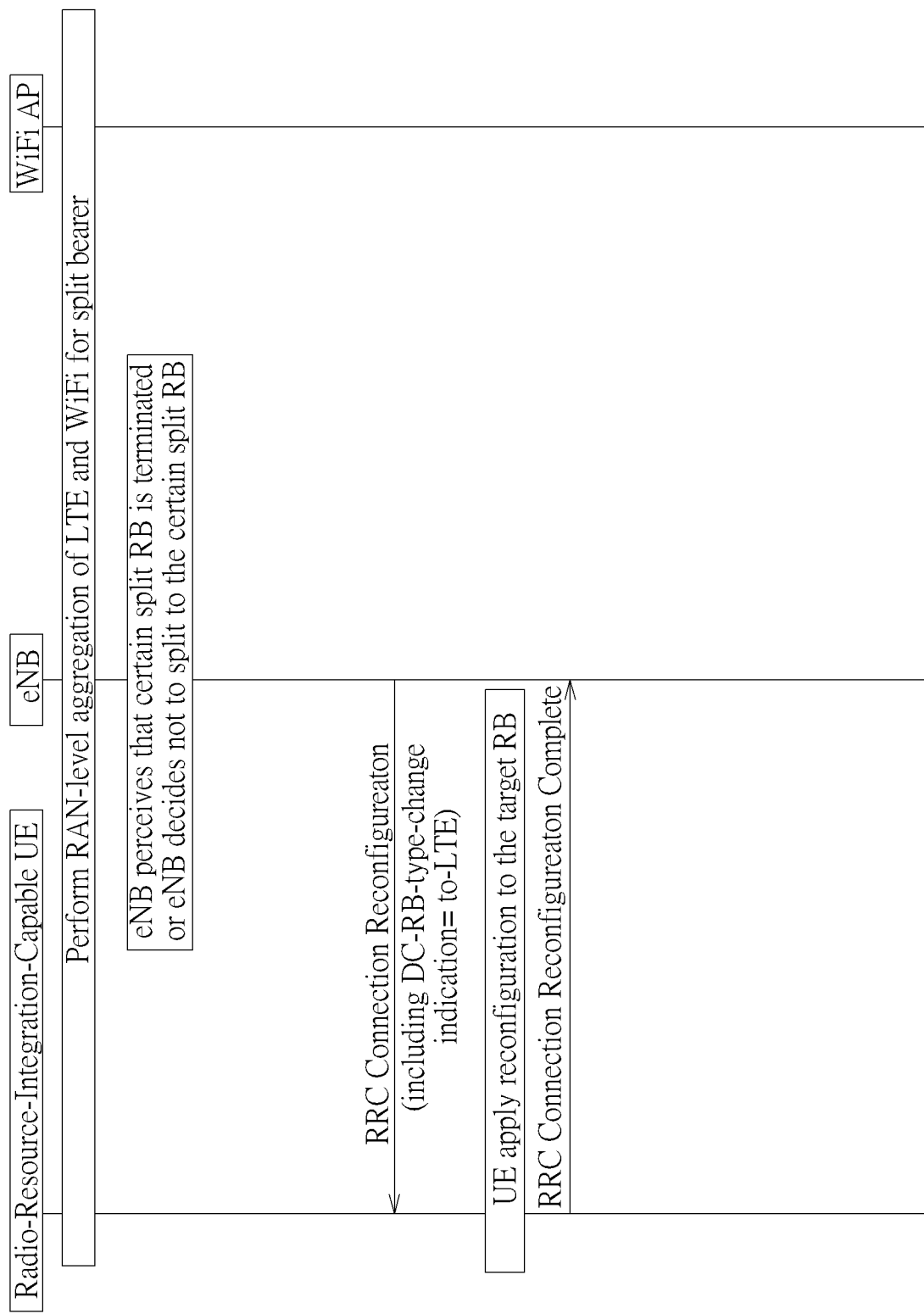
FIG. 21 is a schematic diagram of RB type change without signaling to the AP according to the present disclosure.

Refer to FIG. 21, compared to FIG. 20, in this embodiment, once the eNB decides to change certain split/assisted RB (s) to normal RB(s), the eNB directly sends the RRCConnectionReconfiguration includes DC-RB-type-change indication (to-LTE) to the UE without sending any message to inform the WiFi AP.

Figure 22:
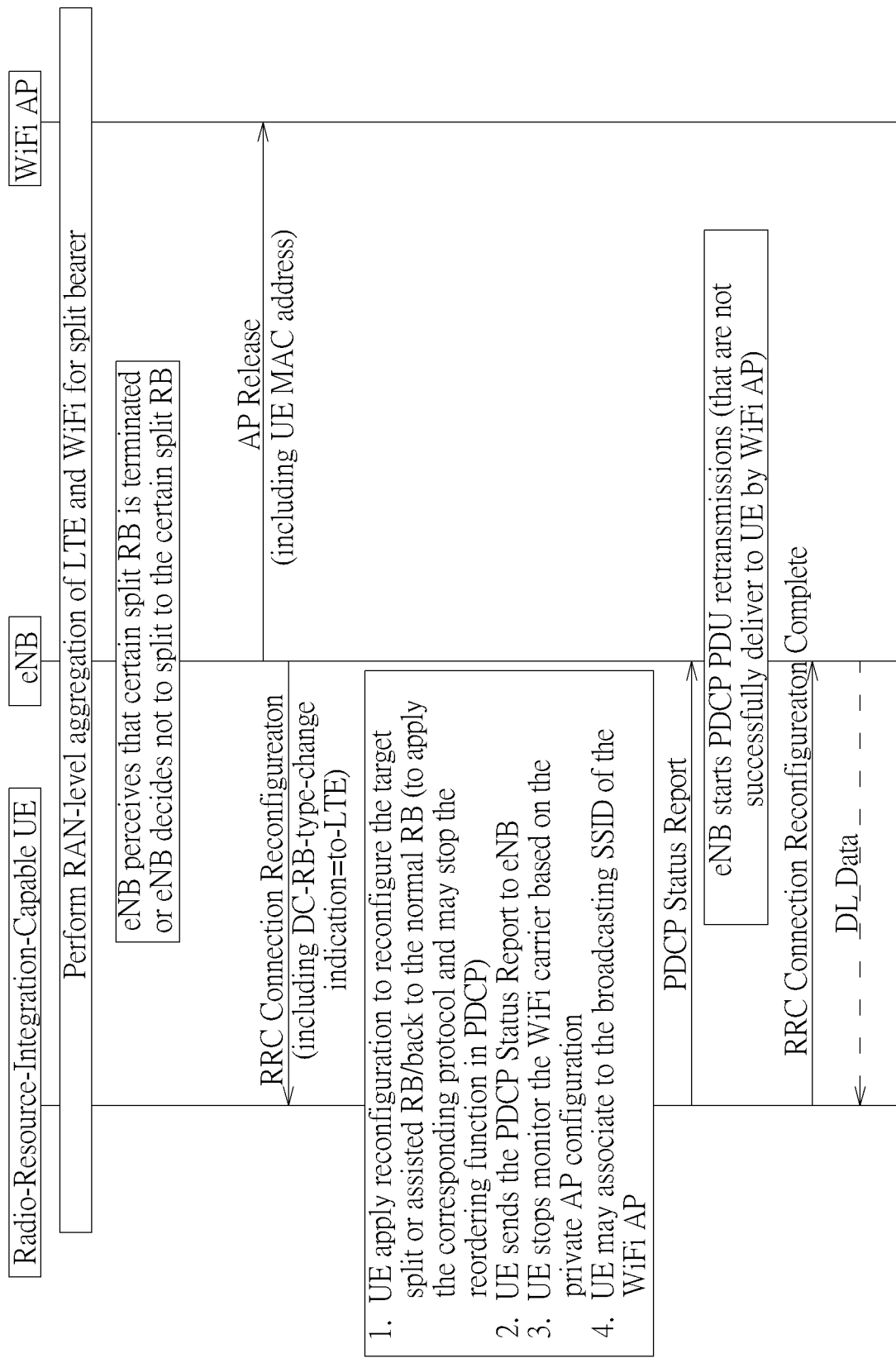
FIG. 22 is a schematic diagram of AP release according to the present disclosure.

Please refer to FIG. 22, which illustrates an embodiment of WiFi AP release. While the eNB receives the AP Release command from the WiFi AP, the eNB would send the RRCConnectionReconfiguration includes the release of Private AP Configuration together with the DC-RB-type-change indication (to-LTE) to the UE to switch the split/assisted bearer(s) to normal (LTE) RBs. Upon receiving the RRCConnectionReconfiguration containing the release of Private AP Configuration together with the DC-RB-type-change indication (to-LTE), the UE apply the configurations to setup the normal bearer(s). For example, the UE applies reconfigurations to reconfigure the target split/assisted RBs back to the normal RB(s) (to apply the corresponding protocol for the normal bearer and may deactivate the reordering function in PDCP). The UE may send the PDCP Status Report to eNB and may stop monitor the WiFi carrier(s) based on the previous private AP configuration. The UE may then associate to the broadcasting (public) SSID of the WiFi AP. After successful reconfigurations, the UE sends the RRCConnectionReconfigurationComplete to the eNB. Upon receiving the RRCConnectionReconfigurationComplete, the eNB starts transmitting all the data to the UE.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 40.

In conclusion, the present invention addresses to RB transmission in dual connectivity of LTE-WLAN aggregation. The eNB shall assign an identity to each PDCP PDU for indicating which RB or PDCP entity the PDCP PDU belongs to, so as to avoid the PDCP PDU routes to incorrect PDCP entity in split RB and/or assisted RB transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of radio bearer transmission in dual connectivity for a mobile device in a long term evolution (LTE) system, wherein the mobile device is capable of simultaneously connecting to an access point (AP) of a wireless local area network (WLAN) and a base station of the LTE system, the method comprising:
   receiving, from the base station, an AP failure report configuration, wherein the AP failure report configuration includes throughput, a number of attempts to connect with the AP, and a timer of the attempts to connect with the AP;
   receiving, from the AP, a packet data convergence protocol protocol data unit (PDCP PDU) associated to a radio bearer (RB) with an identity, wherein the identity indicates which PDCP entity the PDCP PDU belongs to;
   removing the identity of the PDCP PDU; and
   delivering the PDCP PDU to a corresponding PDCP entity according to the identity, wherein the step of delivering the PDCP PDU to the corresponding PDCP entity according to the identity comprises:
   determining to perform a reordering function when an RB type of the RB is a split RB,
   determining not to perform the reordering function when the RB type is an assisted RB, and
   determining not to perform the reordering function when the RB type is a normal RB.

2. The method of claim 1, further comprising:
   transmitting an AP discovery report, mobile device location information, an AP measurement report or an AP failure report to the base station, whereby to assist the base station in determining the RB type.

3. The method of claim 2, wherein the AP discovery report includes at least one SSID and/or BSSID of an AP selected by the mobile device, an MAC address of the mobile device, signal quality corresponding to a selected AP and/or a mobile device class.

4. The method of claim 1, further comprising:
   receiving, from the base station, a private AP configuration indicating a configuration for a PDCP PDU transmission; or
   receiving the private AP configuration indicating a configuration for an RB type change, wherein the RB type includes the split RB which is transmitted by resources of both the base station and an AP, the assisted RB which is transmitted by a resource of the AP, or the normal RB which is transmitted by a resource of the base station; or
   receiving the private AP configuration indicating a configuration with an RB index to be released.

5. The method of claim 4, further comprising:
   transmitting, to the base station, a PDCP status report for a PDCP PDU retransmission.

6. The method of claim 4, wherein the private AP configuration includes at least one of a private SSID, a central frequency and/or a bandwidth for the mobile device, security information for association, an IP address of the mobile device and a time pattern.

7. The method of claim 4, wherein the step of receiving the PDCP PDU associated to the RB with the identity from the AP comprises receiving the PDCP PDU with the identity according to the configuration for the PDCP PDU transmission in the received private AP configuration.

8. The method of claim 2, further comprising:
   receiving, from the base station, the AP failure report configuration for gathering information of usage of an AP resource.

9. The method of claim 1, wherein the identity is a PDCP entity identity.

10. The method of claim 1, wherein more than one of PDCP entities is able to support a split RB type together.

* * * * *